US012562805B2

(12) United States Patent (10) Patent No.: US 12,562,805 B2
Svedman et al. (45) Date of Patent: Feb. 24, 2026

(54) BEAM MANAGEMENT ENHANCEMENTS

(71) Applicant: INTERDIGITAL PATENT HOLDINGS, INC., Wilmington, DE (US)

(72) Inventors: Patrick Svedman, Stockholm (SE); Pascal Adjakple, Great Neck, NY (US); Kyle Pan, Saint James, NY (US); Allan Tsai, Boonton, NJ (US); Yifan Li, Conshohocken, PA (US); Guodong Zhang, Woodbury, NY (US); Rocco Di Girolamo, Laval (CA); Mohamed Awadin, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 344 days.

(21) Appl. No.: 18/249,764

(22) PCT Filed: Oct. 22, 2021

(86) PCT No.: PCT/US2021/056224
§ 371 (c)(1),
(2) Date: Apr. 20, 2023

(87) PCT Pub. No.: WO2022/087392
PCT Pub. Date: Apr. 28, 2022

(65) Prior Publication Data
US 2024/0014880 A1      Jan. 11, 2024

Related U.S. Application Data

(60) Provisional application No. 63/104,179, filed on Oct. 22, 2020.

(51) Int. Cl.
*H04B 7/06* (2006.01)
*H04L 5/00* (2006.01)

(52) U.S. Cl.
CPC ..... *H04B 7/06968* (2023.05); *H04B 7/06964* (2023.05); *H04L 5/0051* (2013.01)

(58) Field of Classification Search
CPC .............. H04B 7/06968; H04B 7/0695; H04B 7/06952; H04B 7/088; H04L 5/0051; (Continued)

(56) References Cited

U.S. PATENT DOCUMENTS

| 10,952,231 | B2 * | 3/2021 | Liou | ..................... H04W 72/23 |
| 2019/0320469 | A1 * | 10/2019 | Huang | .................. H04W 72/23 |

(Continued)

FOREIGN PATENT DOCUMENTS

| CA | 3060845 | A1 * | 5/2020 | ............. H04B 7/088 |
| WO | 2019/066618 | A1 | 4/2019 | |
| WO | WO-2021028059 | A1 * | 2/2021 | .......... H04W 52/242 |

OTHER PUBLICATIONS

3GPP TS 38.214 V15.7.0 NR; Physical layer procedures for data (Release 15) (Year: 2019).*

(Continued)

*Primary Examiner* — Andrew W Chriss
(74) *Attorney, Agent, or Firm* — Flaster Greenberg P.C.

(57) ABSTRACT

Beam management for the downlink can be based on user equipment (UE) measurement of downlink (DL) reference signal (RS) and UE reporting. An alternative approach that may reduce overall RS overhead and latency is BM for the downlink based on uplink (UL) RS. With this approach, the network measures UL RS transmissions on multiple beams and uses these measurements for managing beams for the DL. Disclosed herein are various problems and enhancements related to UL RS based DL BM, in particular beam failure detection and recovery.

20 Claims, 35 Drawing Sheets

(58) Field of Classification Search
CPC ... H04L 5/0023; H04L 5/0091; H04L 5/0096;
H04L 5/0098
See application file for complete search history.

(56) References Cited

U.S. PATENT DOCUMENTS

| | | | |
|---|---|---|---|
| 2020/0045569 A1 | 2/2020 | Seo et al. | |
| 2021/0153186 A1* | 5/2021 | Zhou | H04L 5/0035 |
| 2022/0271890 A1* | 8/2022 | Grossmann | H04L 5/0051 |
| 2024/0171328 A1* | 5/2024 | Nam | H04L 5/0035 |

OTHER PUBLICATIONS

Takeda et al, "Understanding the Heart of the 5G Air Interface: An Overview of Physical Downlink Control Channel for 5G New Radio", IEEE Communications Standards Magazine (Year: 2020).*
"Technical Specification Group Radio Access Network; NR; Medium Access Control (MAC) protocol specification," 3GPP TS 38.321 V16.2.1, 2020, Release 16, pp. 154.
"Technical Specification Group Radio Access Network; NR; Multiplexing and channel coding," 3GPP TS 38.212 V16.3.0, 2020, Release 16, pp. 152.
"Technical Specification Group Radio Access Network; NR; Physical channels and modulation," 3GPP TS 38.211 V16.3.0, 2020, Release 16, pp. 133.
"Technical Specification Group Radio Access Network; NR; Physical layer procedures for control," 3GPP TS 38.213 V16.3.0, 2020, Release 16, pp. 179.
"Technical Specification Group Radio Access Network; NR; Physical layer procedures for data," 3GPP TS 38.214 V16.3.0, 2020, Release 16, pp. 166.
"Technical Specification Group Radio Access Network; NR; Radio Resource Control (RRC) protocol specification," 3GPP TS 38.331 V16.2.0, 2020, Release 16, pp. 921.
Samsung, "Revised WID: Further enhancements on MIMO for NR," 3GPP TSG RAN Meeting #89e RP-202024, Sep. 14-18, 2020, pp. 5.
ZTE, "Further discussion on CSI-RS based RLM," 3GPP Draft; R4-1807259 Further Discussion on CSI-RS Based RLM, 3rd Generation Partnership Project (3GPP), Mobile Competence Centre; 650, Route Des Lucioles; F-06921 Sophia-Antipolis Cedex; France vol. RAN WG4, No. Busan, Korea; May 21, 2018-May 25, 2018, May 20, 2018.

* cited by examiner

221. Start

222. UE is Configured with BFD RS and Common Beam Operation

223. UE Performs BFD on BFD RS based on Configured TCI State(s) (If Any)

224. UE Receives a Common Beam TCI State(s) Activation

225. UE Applies Activated TCI State(s) to CORESET(s), PDSCH and CSI-RS that is/are BFD RS 226. UE Performs BFD on BFD RS based on Activated TCI State(s)

First Set of Beams, e.g. SRS for BM

DL-serving SRS Beam

Recovery Beams

BEAM MANAGEMENT ENHANCEMENTS

CROSS-REFERENCE TO RELATED APPLICATIONS

This application is the National Stage Application of International Patent Application No. PCT/US2021/056224, filed Oct. 22, 2021, which claims the benefit of U.S. Provisional Patent Application No. 63/104,179, filed on Oct. 22, 2020, entitled "Beam Management Enhancements," the contents of which are hereby incorporated by reference herein.

BACKGROUND

The network can configure or indicate to the user equipment (UE) quasi-location (QCL)-relationships between different reference signals (RSs). A QCL-relationship has a source RS and a target RS (the target can also be a physical channel, but this example is henceforth omitted for brevity). The QCL-relationship may assist the UE in the reception or processing of the target RS by applying one or more parameters estimated from the source RS.

This background information is provided to reveal information believed by the applicant to be of possible relevance. No admission is necessarily intended, nor should be construed, that any of the preceding information constitutes prior art.

SUMMARY

Disclosed herein are methods, systems, and devices that may assist in beam management enhancements. Beam management (BM) is a necessary functionality in multi-beam systems. It is used to maintain suitable transmit and receive beams for control and data transmissions as well as for relevant reference signal transmissions. Disclosed herein is BM for the downlink, e.g., for managing beams for downlink (DL) channels/signals.

BM for the downlink can be based on UE measurement of DL RS and UE reporting. An alternative approach that may reduce overall RS overhead and latency is BM for the downlink based on uplink (UL) RS. With this approach, the network measures UL RS transmissions on multiple beams and uses these measurements for managing beams for the DL. Disclosed herein are various problems and enhancements related to UL RS based DL BM, in particular beam failure detection and recovery.

Another approach to enhance BM efficiency is to employ common beam operation, in which a common beam is applied to control and data, thereby reducing overhead and latency. Also, enhancements are disclosed for beam failure detection when common beam operation is used.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Quasi Co-Location (QCL) in NR

Figure 1:
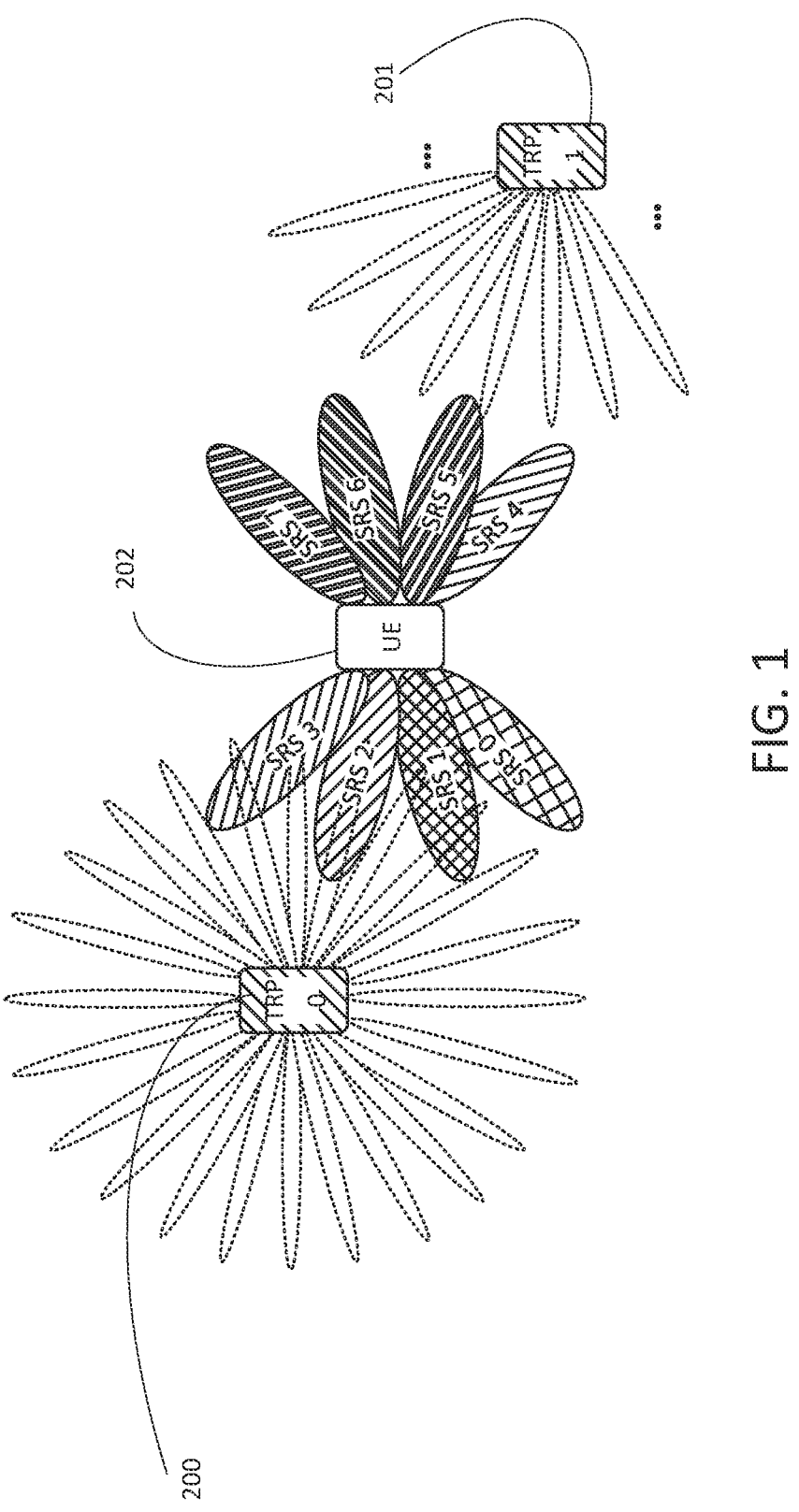
FIG. 1 illustrates an exemplary UE that transmits SRS for BM and the network (here illustrated by two TRPs) performs measurement.

The network can configure/indicate to the UE QCL-relationships between different RSs. A QCL-relationship has a source RS and a target RS (the target can also be a physical channel, but this example is henceforth omitted for brevity). The QCL-relationship can assist the UE in the reception or processing of the target RS by applying one or more parameters estimated from the source RS.

The network can configure for which kind of parameters a QCL-relationship holds. For example, the following QCL types are defined in 3GPP TS 38.214, V16.3.0, September 2020: 'QCL-TypeA': {Doppler shift, Doppler spread, average delay, delay spread}, 'QCL-TypeB': {Doppler shift, Doppler spread}, 'QCL-TypeC': {Doppler shift, average delay}, and 'QCL-TypeD': {Spatial Rx parameter}.

The source RS can be Synchronization signal/PBCH block (SSB) or CSI-RS resource (also called CSI-RS herein for brevity).

The target RS can be CSI-RS resource, DMRS of PDCCH, or DMRS of PDSCH.

CSI-RS for Tracking (TRS)

It may be beneficial for communication performance of PDCCH or PDSCH to first receive an RS that is a QCL-typeA source RS for PDCCH DMRS or PDSCH DMRS. The UE may for instance track time or frequency offsets based on this RS.

Such an RS may be a CSI-RS for tracking (also called tracking RS, TRS). A TRS may comprise one or more NZP CSI-RS resource sets, which each may be configured with the parameter trs-Info set to 'enable'. Each of those NZP CSI-RS resource sets may comprise a set of NZP CSI-RS resources, e.g., 4 NZP CSI-RS resources with 2 NZP CSI-RS resources in the same slot. The NZP CSI-RS resources of TRS NZP CSI-RS resource set may be located in two consecutive slots or in non-consecutive slots.

CSI-RS for Beam Management (BM)

CSI-RS for BM may be used to manage transmit and receive beams at both the network and the UE side.

In some cases, CSI-RS for BM are NZP CSI-RS resources in an NZP CSI-RS resource set with parameter repetition set to 'on'. In this case, the UE may assume that all the NZP CSI-RS resources within the resource set are transmitted using the same downlink spatial domain transmission filter.

In some cases, CSI-RS for BM are NZP CSI-RS resource in an NZP CSI-RS resource set, where the NZP CSI-RS resource set is included as channel measurement resource (e.g., in parameter resourcesForChannelMeasurement) in a CSI report configuration (e.g., in an IE CSI-ReportConfig) with reporting quantity (e.g., parameter reportQuantity) being for example L1-RSRP or L1-SINR. The term CSI-RS for BM may herein also represent NZP CSI-RS resources configured with other reporting quantities, such as channel quality indicator (CQI), rank indicator (RI) and precoder matrix indicator (PMI).

Statement 1—Beam Failure Detection Based on UL RS and Common Beam Operation

Consider the scenario in which UL RSs are used for DL beam management. In this scenario, DL RS overhead, interference and power consumption can be reduced by transmitting less, or even no, CSI-RS for BM. In this case, it might not be possible to operate beam failure detection as in state-of-the-art systems. Efficient solutions are needed to also consider common beam operation.

Statement 2—Beam Failure Recovery

If UL RSs are used for DL BM, beam failure may be detected at the networks side, instead of at the UE in state-of-the-art systems. In this case, the recovery needs to be initiated by the network, instead of by the UE. Efficient solutions for network-initiated beam failure recovery are needed, considering common beam operation, beam recovery latency, or UE power consumption.

Since CSI-RS for BM might not be widely available in the considered scenario, new beam identification may have to be based on SSBs.

However, SSB may be transmitted with a wider beam than CSI-RS, which means lower antenna array gain. Furthermore, measurement accuracy based on SSB may not be as good as CSI-RS, due to lower bandwidth, etc.

Statement 3—Enhanced Multi-RS TCI-State

Even if the amount of CSI-RS, e.g., CSI-RS for BM, can be significantly reduced if UL RSs are used for DL beam management, it might not be feasible to omit the transmission of CSI-RS for tracking (TRS) in the DL. The reason is that a-priori time-frequency tracking (QCL-TypeA) may be needed to receive PDCCH, including DMRS, and PDSCH, including DMRS, with high performance.

In a multi-beam system, there are multiple ways to configure and operate TRS for a UE.

TRS operation in a multi-beam scenario involves large excessive configurations and reconfiguration overhead. In the light of the effort to streamline beam operation for control and data with the common beam approach, the beam management for TRS should also be streamlined in terms of RS and reconfiguration overhead.

Statement 4—MPE Event

In some cases, a UE needs to reduce the maximum transmit power on a subset of the SRS for BM, due to the detection of an MPE event. This could mean that the network gets a biased estimate of the DL beams based on the measurements on the SRS for BM, since corresponding maximum power reduction is not required in the DL. Efficient solutions to handle this are required to allow proper DL beam management also in the event of maximum permissible exposure (MPE) events.

Beam management (BM) is a necessary functionality in multi-beam systems. It is used to maintain suitable transmit and receive beams for control and data transmissions as well as for relevant reference signal transmissions. Disclosed herein is BM for the downlink, i.e., for managing beams for DL channels/signals.

BM for the downlink can be based on UE measurement of DL RS and UE reporting. An alternative approach that may reduce overall RS overhead and latency is BM for the downlink based on UL RS. With this approach, the network measures UL RS transmissions on multiple beams and uses these measurements for managing beams for the DL. Disclosed herein are various problems and enhancements related to UL RS based DL BM, in particular beam failure detection and recovery.

Another approach to enhance BM efficiency is to employ common beam operation, in which a common beam is applied to control and data, thereby reducing overhead and latency. Also, enhancements are disclosed for beam failure detection when common beam operation is used.

Common Beam Operation in NR Rel-17

NR in Rel-15/16 supports a flexible framework for configuring/indicating QCL information for various signals and channels. Different QCL information can be applied to different CSI-RS, different CORESETs (used for monitoring and receiving PDCCH) and PDSCH. Furthermore, different QCL information can be applied to different BWPs in a cell and also to different cells. This can imply a large signaling overhead, even if all those signals and channels use the same beam pair (e.g., the beam at the transmitter and the beam at the receiver), which is a quite common scenario. As a consequence, common beam operation will be specified in NR Rel-17, e.g., for overhead reduction.

In common beam operation, source reference signal(s) in M (e.g., M=1 or M≥1) TCIs (e.g., TCI states or TCI codepoints) provide common QCL information at least for UE-dedicated reception on PDSCH and one or more subset(s) of CORESETs (including configured CORESET(s)) in a CC (e.g., a serving cell). The TCI state(s) may be applied to one or more serving cells, e.g., cells in a band or cells in a configured list of serving cells. The TCI state(s) may be applied to one, a subset, or all DL BWPs of those serving cell(s).

The M TCIs for common beam operation may be indicated, activated/deactivated, or updated dynamically using one or more DCI(s) or one or more MAC CE(s). The term indication is often used for DCI-based signaling. For the MAC CE based signaling, the term (de-)activation is common. Updating can be done after an initial indication or activation. Henceforth, the term activation also includes the notion of deactivation, i.e., "activation or deactivation". In some cases, a subset of the M TCIs may be indicated/activated/updated using a DCI or a MAC CE. For example, a TCI state indication/activation/update in a DCI or a MAC CE may apply to a subset of CORESETs associated with a certain CORESET pool index value (e.g., 0 or 1), e.g., through parameter coresetPoolIndex-r16.

In one example, a TCI codepoint received in a first DCI on a CORESET associated with a first CORESET pool index value may be used to indicate/activate/update the TCI state(s) of CORESET(s) with the first CORESET pool index value. A TCI codepoint received in a second DCI on a CORESET associated with a second CORESET pool index value may be used to indicate/activate/update the TCI state(s) of CORESET(s) with the second CORESET pool index value. For instance, if the TCI codepoint received in the first DCI indicates one TCI state and the TCI codepoint received in the second DCI indicates one TCI state, then M may be equal to 2.

In another example, a TCI codepoint received in a DCI may correspond to multiple, e.g., 2, TCI states. In some cases, different subsets of these multiple TCI states are applied to different subsets of CORESET, e.g., a first TCI state is applied to CORESET(s) associated with a first CORESET pool index and a second TCI state is applied to CORESET(s) associated with a second CORESET pool index.

In another example, a TCI state activation/update received in a first MAC CE in a PDSCH scheduled by a PDCCH received on a CORESET associated with a first CORESET pool index value may be used to indicate/activate/update the TCI state(s) of CORESET(s) with the first CORESET pool index value. A TCI state activation/update received in a second MAC CE in a PDSCH scheduled by a PDCCH received on a CORESET associated with a second CORESET pool index value may be used to indicate/activate/update the TCI state(s) of CORESET(s) with the second CORESET pool index value.

In another example, a TCI state activation/update received in a MAC CE may correspond to multiple, e.g., 2, TCI states. In some cases, different subsets of these multiple TCI states are applied to different subsets of CORESET, e.g., a first TCI state is applied to CORESET(s) associated with a first CORESET pool index and a second TCI state is applied to CORESET(s) associated with a second CORESET pool index.

In some cases, multiple TCI states, e.g., two TCI states, indicated/activated/updated by a DCI or MAC CE are applied to the same CORESET, i.e., a CORESET may have multiple simultaneously active TCI states.

The (activated) TCI state(s) for PDSCH may follow the (activated) TCI state(s) of the CORESET(s) in the DL BWP. For example, if M=1 the same TCI state is applied to CORESET(s) and PDSCH. For example, if M>1 (e.g., M=2) a UE may apply all or a subset of the M TCI states for PDSCH reception. For example, if M=2, the UE may apply both or one of the TCI states for PDSCH reception. For instance, a UE may apply the TCI state(s) activated for the CORESET(s) on which the DCI was received that scheduled the PDSCH.

DL Beam Management Based on UL RS as DL QCL Source

It has been disclosed to include SRS resource (also called SRS herein for brevity), which is an UL RS, as a possible QCL source RS for other DL target RS, in addition to the possible DL RS listed with reference to QCL in NR.

DL Beam Management Based on UL RS as DL QCL Source—Configuration

Adding an SRS as DL QCL source can be achieved for example by adding SRS resource as an option in QCL-Info, as exemplified in Table 1-Table 3.

TABLE 1

| TCI-State Information Element |
| --- |

```
-- ASN1START
-- TAG-TCI-STATE-START
TCI-State-r17 ::=     SEQUENCE {
   Tci-StateId         TCI-StateId,
   qcl-Type1           QCL-Info-r17,
   qcl-Type2           QCL-Info-r17          OPTIONAL, -- Need R}
QCL-Info-r17 ::=      SEQUENCE{
   cell                ServCellIndex         OPTIONAL,  --Need R
   bwp-Id              BWP-Id                OPTIONAL,  --Cond
                                             CSI-RS-SRS-Indicated referenceSignal        CHOICE {
      csi-rs              NZP-CSI-RS-ResourceId,
      ssb                 SSB-Index,
      srs                 SRS-ResourceId
   },
   qcl-Type               ENUMERATED {typeA, typeB, typeC, typed},
   ...

}
-- TAG-TCI-STATE-STOP
-- ASN1STOP
```

TABLE 2

| QCL-Info-r17 field descriptions |
| --- | bwp-Id
The DL BWP which the RS is located in, if csi-rs is included or the UL BWP which the RS is located in, if srs is included.
cell
The UE's serving cell in which referenceSignal is configured. If the field is absent, it applies to the serving cell in which the TCI-State

TABLE 2-continued

QCL-Info-r17 field descriptions is configured. The RS can be located on a serving cell other than the serving cell in which the TCI-State is configured only if the qcl-Type is configured as typeC or typeD. See TS 38.214 clause 5.1.5.
referenceSignal
Reference signal with which quasi-collocation information is provided as specified in TS 38.214 subclause 5.1.5.
qcl-Type
QCL type as specified in TS 38.214 subclause 5.1.5.

TABLE 3

| Conditional Presence | Explanation |
| --- | --- |
| CSI-RS-SRS-Indicated | This field is mandatory present if csi-rs or srs is included, absent otherwise |

SRS as a DL source RS may be limited to QCL type-D. Furthermore, only certain kinds of SRS may be configured as DL source RS, for example SRS for BM, i.e., an SRS resource included in an SRS resource set with the parameter usage set to 'beamManagement'. SRS for BM may also refer to an SRS resource set with the parameter usage set to 'beamManagement'.

If an SRS is configured or indicated to be a DL QCL source RS with QCL typeD, the UE may derive a spatial parameter applicable for receiving an associated target RS from the SRS. For example, the UE may use the spatial domain filter used for SRS transmission as spatial domain filter used for target RS reception. A spatial domain filter may correspond to a beam, i.e., a spatial domain transmission filter may correspond to transmit beam and spatial domain reception filter may correspond to a receive beam. In some cases, a spatial domain filter corresponds to a part of the total beam, e.g., hybrid beam. For example, in an implementation with hybrid beamforming, a spatial domain filter may correspond to the analog beamforming part of a hybrid implementation. Additional beamforming adaptation may be performed in the digital beamforming part, e.g., by signal phase shifting and scaling in digital baseband.

The UE may also jointly provide feedback to the network (e.g., base station) by transmitting the SRS to indicate to the network its preferred DL beams so that the network can adjust DL beams accordingly.

There may be a certain time delay between the indication/activation of a TCI state including an UL RS as a QCL-typeD source RS and the time instant the UE starts to use the indicated/activated TCI state for reception of the target RS. For example, if the indication/activation is in a DCI, there may be a certain time delay between the time of PDCCH reception and the time instant the UE starts to use the indicated/activated TCI state for reception of the target RS. For example, if the indication/activation is in a MAC CE in a PDSCH, there may be a certain time delay between the time of corresponding PDSCH (TB) acknowledgement transmission and the time instant the UE starts to use the indicated/activated TCI state for reception of the target RS. DL Beam Management Based on UL RS as DL QCL Source—Discussion on Use Cases Consider the case that the UE is configured with SRS for BM, e.g., one or more SRS resource sets with the parameter usage set to 'beamManagement'. The SRS for BM may be periodic, semi-persistent or aperiodic, or a combination thereof (e.g., a periodic SRS resource set and an aperiodic SRS resource set). The SRS for BM may be used for UL BM, i.e., as spatial reference for other UL signals/channels such as other SRS, PUCCH, PUSCH, in addition to the DL BM that is mainly considered herein.

The set of UE beams used for transmitting SRS for BM could also be used for receiving DL signals/channels. This may assume UE beam correspondence, i.e., that the UE can use a certain UL Tx beam as DL Rx beam, and vice versa.

An exemplary DL BM procedure based on SRS for BM is outlined and illustrated below.

In a first step, UE 202 transmits SRS for BM. The network (e.g., TRP 200 or TRP 202) measures the SRS using multiple beams, e.g., using hybrid or digital beamforming. This is illustrated in FIG. 1.

In a second step, the network indicates to UE 202 to use a particular SRS (for example, SRS 2) as QCL source assumption for gNB's DL transmission(s) (e.g., TRP 200).

Figure 2:
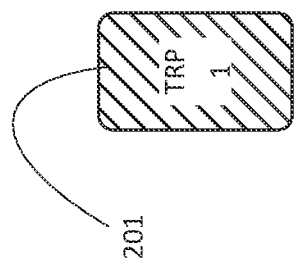
FIG. 2 illustrates an exemplary UE that receives DL transmission(s) using the beam corresponding to the indicated SRS.
Figure 2:
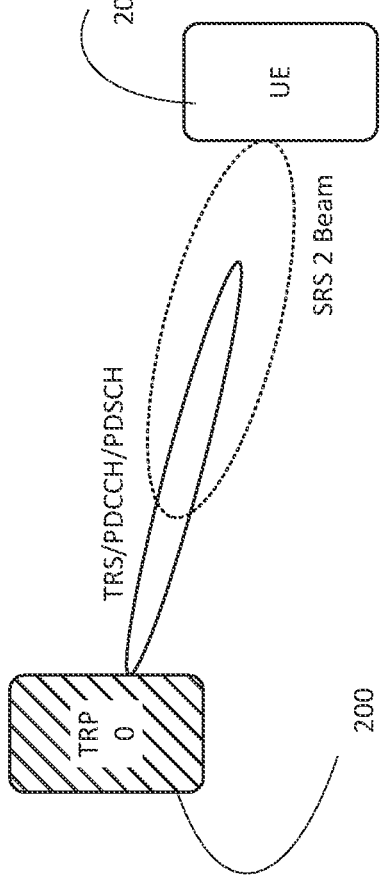

In a third step, the network transmits DL signals/channel (e.g., TRS, PDCCH, or PDSCH) and UE 202 uses the beam corresponding to SRS 2 to receive the DL transmission(s). This is illustrated in FIG. 2.

A first use case considered herein is based on the use of SRS for BM as a replacement of CSI-RS for BM to a large extent. This may be possible since: DL Rx beam (UE 202) is based on the indicated SRS for BM; DL Tx beam (NW) is based on network measurement on SRS; UL Tx beam (UE) is based on the indicated SRS for BM; and UL Rx beam (NW) is based on network measurement on SRS.

With reference to DL Rx beam (UE 202) is based on the indicated SRS for BM, further beam adjustment at UE 202 is not needed in some cases, e.g., UE 202 supports beam correspondence. Further beam adjustment at UE 202 may be needed in other cases, e.g., UE 202 supports partial beam correspondence.

With reference to DL Tx beam (NW) is based on network measurement on SRS, note that it may be possible to adjust this beam with a much finer granularity than the granularity that is feasible for CSI-RS for BM. This may be possible if the beam granularity for reception is finer than the beam granularity for transmission. For instance, if the NW performs digital Rx beamforming, it may adjust its Rx beam to almost perfectly match the transmitted SRS, e.g., to the level of baseband resolution in terms of signal phase and amplitude. With beam correspondence, the same, almost perfectly matched, beam can be used for the DL transmission. If, on the other hand, CSI-RS for BM is used for DL BM, the granularity may be limited by the number of different CSI-RS for BM that can be transmitted. Since the CSI-RS for BM may need to sample a large beam space, e.g., a large set of angles, they may need to be transmitted relatively sparsely.

Even though CSI-RS for BM may be reduced or even not needed in this use case, other kinds of CSI-RS may be needed. For example, a TRS may need to be transmitted from TRP 200 on the serving beam (e.g., based on the SRS for BM) for time-frequency tracking at UE 202 side. Also, a CSI-RS for CSI acquisition transmitted on the serving beam may be useful. However, it can be noted that both the TRS and CSI-RS for CSI acquisition can be transmitted on the serving beam pair only (e.g., as illustrated in FIG. 2). CSI-RS for BM is not needed in this use case and can be omitted.

A second use case considered herein is based on the use of SRS for BM used as a complement to CSI-RS for BM. However, the discussion on solutions herein is largely based on the first use case, since it is cleaner in terms of functionality (DL BM based on UL RS) and offers the greatest reduction of DL RS transmission, measurement and reporting.

DL Beam Management Based on UL RS as DL QCL Source—UE Power Consumption of DL Beam Management Here, the UE power consumption of DL beam management is briefly discussed. DL BM based on CSI-RS for BM is compared with DL BM based on SRS for BM (e.g., first use case described for DL Beam Management Based on UL RS as DL QCL Source).

DL BM based on CSI-RS for BM may involve the following UE 202 actions: Periodic reception and UE Rx beam sweeping for all relevant CSI-RS for BM; UE measurement of L1-RSRP of all relevant CSI-RS for BM, using the best UE Rx beam found during beam sweeping; or UE encoding and transmission measurement report on PUCCH (e.g., periodic L1-RSRP reporting) or PUSCH (aperiodic L1-RSRP reporting). With reference to periodic reception and UE Rx beam sweeping for all relevant CSI-RS for BM, the number of CSI-RS for BM may be high or very high (e.g., hundreds), due to massive MIMO or multi-TRP implementation at the network.

DL BM based on SRS for BM may involve the following UE 202 actions: UE 202 transmits SRS for BM. The number of SRS for BM may be low (e.g., 8, 16) due to smaller UE antenna system.

It can be noted that both approaches involve UE UL transmissions, either UE feedback of L1-RSRP measurement reports or the transmission of SRS.

Beam Failure Detection (BFD)—Introduction

In a multi-beam scenario, a link between TRP(s) and UE 202 can fail for various reasons such as blocking, UE rotation, or sudden interference. Such a beam failure may be dependent on the beam(s) used at the network side and the beam(s) used at the UE side used for the link. If the failure can be timely detected, it may be possible to recover the link using a different set of beams at the network (e.g., TRP 200) and UE side.

DL-based BFD (e.g., DL RS based BFD) is based on UE 202 performing measurement and radio link quality estimation, based on a set of DL RS, e.g., CSI-RS for BM or SSBs, herein called a set of BFD RS.

In some cases, a set of BFD RS is explicitly configured for a BWP, e.g., by configuring one or more RS indices for BFD in a radio link monitoring configuration, e.g., a RadioLinkMonitoringConfig IE.

In some cases, no BFD RS is explicitly configured for a BWP. In this case, UE 202 may determine one or more BFD-RS from the set of source RS to the monitored CORESET(s) on the BWP, e.g., RS that are QCL source RS for DMRS of PDCCH monitored in the CORESET. This may be called implicitly configured or implicitly determined BFD RS. If there are multiple source RSs associated with a monitored CORESET, UE 202 may include the source RS(s) with QCL-TypeD from that CORESET in the set of BFD RS. If there is a single source RS associated with a monitored CORESET, UE 202 may include that source RS in the set of BFD RS.

An alternative to DL-based BFD is UL-based BFD. For UL-based BFD, the network (e.g., TRP 200) detects beam failure based on one or more UL RS, e.g., SRS for BM. Since such UL-based BFD would be up to the network implementation, it is not discussed further here. However, UL-based beam failure recovery, following network-detected beam failure is further discussed with reference to BFR for UL-based BFD.

Henceforth, beam failure detection based on signals including CSI-RS for BM and CSI-RS for tracking (TRS) is considered. For simplicity, we write CSI-RS to represent any or both of CSI-RS for BM and CSI-RS for tracking.

For the case a CSI-RS for tracking is configured as BFD RS, the BFD RS may be a CSI-RS resource in a CSI-RS resource set with the parameter trs-Info configured. There may be further constraints, for example that the CSI-RS resource is periodic. UE 202 may assume that an antenna port with the same antenna port index in different CSI-RS resources in the CSI-RS resource set (for tracking) is the same. Hence, UE 202 may perform beam failure detection on any such CSI-RS resource in a CSI-RS resource set (for tracking) if one of the CSI-RS resources is configured as BFD RS.

BFD—Common Beam Operation with Explicitly Configured BFD RS

In some cases, UE 202 is configured with common beam operation, as described with reference to common beam operation in NR Rel-17. In some cases, common beam update (e.g., M TCI states or a subset thereof) is applied also to all or a subset of the configured CSI-RS, in addition to CORESET(s) and PDSCH.

For example, UE 202 may be configured with B CSI-RS in the active DL BWP. UE 202 may also be configured to activate/update TCI state(s) of one or more (e.g., M or fewer than M) of those CSI-RS based on common beam operation. Note that B may be greater than M in some cases, equal to M in some cases and smaller than M in some cases.

In some cases, if a CSI-RS is also explicitly configured as a BFD-RS, its TCI state may be indicated/activated/updated by common beam operation. Note that the number of configured CSI-RS may be greater than or equal to the number of CSI-RS that is also configured as BFD RS. In some cases, common beam is applied also to a CSI-RS that is also configured as BFD RS if common beam operation is configured to UE 202 by the network. In some cases, the network can configure UE 202 whether or not to apply common beam update to BFD RS, e.g., in addition to the other channels/signal to which the common beam is applied, such as PDCCH and PDSCH. Hence, in some cases, common beam is applied also to a CSI-RS that is also configured as BFD RS if common beam operation is configured and also common beam update of BFD RS is configured to UE 202 by the network (e.g., TRP 200). Note that a common beam update/activation of TCI state(s) may update/activate TCI state(s) for all configured DL BWPs of a serving cell. If the common beam TCI state(s) is applied to BFD RS, it may be applied all or a subset of the DL BWPs of the serving cell, e.g., those DL BWPs with BFD RS explicitly configured.

Such an approach could significantly reduce the reconfiguration overhead for BFD RS when common beam operation is applied to PDCCH. The purpose of BFD is typically to monitor the radio link quality (or beam quality) of the DL control channel beams. Hence, low overhead update of QCL assumption(s) for BFD RS together with common beam update of PDCCH allows for efficient operation. Note that CSI-RS that are not also BFD RS should not be updated based on common beam operation, since such CSI-RS may be used to monitor other beams, e.g., candidate beams.

Consider an example with M=1 and with one CSI-RS explicitly configured as BFD RS in the active DL BWP. UE 202 receives a DCI or MAC CE indicating a TCI state for common beam operation. The TCI state is applied to CORESET(s) and PDSCH, e.g., as described in with reference to common beam operation in NR Rel-17. The TCI state may also be applied to the CSI-RS that is also configured as BFD RS.

Consider an example with M=1 and with multiple (e.g., two) CSI-RS explicitly configured as BFD RS in the active DL BWP. UE 202 receives a DCI or MAC CE indicating a TCI state for common beam operation. The TCI state is applied to CORESET(s) and PDSCH, e.g., as described with reference to common beam operation in NR Rel-17. In one example the TCI state may also be applied to one of the multiple CSI-RS that are also configured as BFD RS. In another example it may also applied to each of the multiple CSI-RS that are also configured as BFD RS.

Consider an example with M>1 and with one CSI-RS explicitly configured as BFD RS in the active DL BWP. Two examples are below.

In one example, UE 202 receives a DCI or MAC CE indicating a TCI state for common beam operation. The TCI state is applied to CORESET(s) and PDSCH, e.g., as described with reference to common beam operation in NR Rel-17. In some cases, the TCI state may be applied also to the CSI-RS that is also configured as BFD RS. In some cases, the TCI state may be applied to the CSI-RS that is also configured as BFD RS under certain conditions, for example that the TCI state update corresponds to a certain CORESET pool index. M can be greater than one, as in this case, also if a DCI or MAC CE indicates a single TCI state, e.g., if different DCIs or MAC CEs are used to update different common beams. In this example with multiple common beams (M>1) and a single CSI-RS as BFD RS, the TCI state (beam) of the CSI-RS is for example only updated if one of the common beams (one of M) is updated.

In another example, UE 202 receives a DCI or MAC CE indicating multiple TCI states for common beam operation. The TCI states are applied to CORESET(s) and PDSCH, e.g., as described with reference to common beam operation in NR Rel-17. In some cases, one of the TCI states may be applied also to the CSI-RS that is also configured as BFD RS. For example, in the case of indication through DCI, which TCI state to apply to the CSI-RS is determined by its ordinal position (e.g., the first) in the MAC CE that activated the multiple TCI states for the corresponding TCI codepoint that was indicated in the DCI. In another example, in the case of indication through MAC CE, which TCI state to apply to the CSI-RS is determined by its ordinal position (e.g., the first) in the MAC CE that indicated/activated/updated TCI states for common beam operation.

In various cases, the location of the TCI state(s) indication for common beam operation is configurable. For example, the network may configure to UE 202 that TCI state indication is present in a DCI format. The network (e.g., TRP 200) may additionally configure the location of this field in a DCI, e.g., which and how many bits that correspond to the TCI field(s). In other examples, the network configures UE 202 to receive TCI state(s) indication for common beam operation in a MAC CE or in a combination of MAC CE and DCI.

Consider an example with M>1 and with multiple CSI-RS explicitly configured as BFD RS in the active DL BWP. Two examples are below.

In one example, UE 202 receives a DCI or MAC CE indicating a TCI state for common beam operation. The TCI state is applied to CORESET(s) and PDSCH, e.g., as described with reference to common beam operation in NR Rel-17. In some cases, the TCI state may be applied also to the multiple CSI-RS that is also configured as BFD RS. In some cases, the TCI state may be applied to a subset (e.g., one) of the CSI-RS that is also configured as BFD RS under certain conditions, for example that the TCI state update corresponds to a certain CORESET pool index. The subset of the CSI-RS that is also configured as BFD RS may depend on the CORESET pool index to which the TCI state update is associated. Note that M can be greater than one, as in this case, also if a DCI or MAC CE indicates a single TCI state, e.g., if different DCIs or MAC CEs are used to update different common beams, e.g., multiple DCIs/MAC CEs may be used to update the multiple (M>1) common beams.

In another example, UE 202 receives a DCI or MAC CE indicating multiple TCI states for common beam operation. The TCI states are applied to CORESET(s) and PDSCH, e.g., as described with reference to common beam operation in NR Rel-17. For example, each indicated TCI state is applied to a CSI-RS that is also configured as BFD RS, e.g., based on associated CORESET pool index or based on ordinal position of the corresponding TCI state in MAC CE that activated the multiple TCI states for the corresponding TCI codepoint that was indicated in the DCI or ordinal position in the MAC CE that indicated/activated/updated TCI states for common beam operation.

Note that, in some cases, common beam operation, BFD RS, M, B, etc., may be configured per serving cell and applicable to each BWP of the cell.

Figure 3:
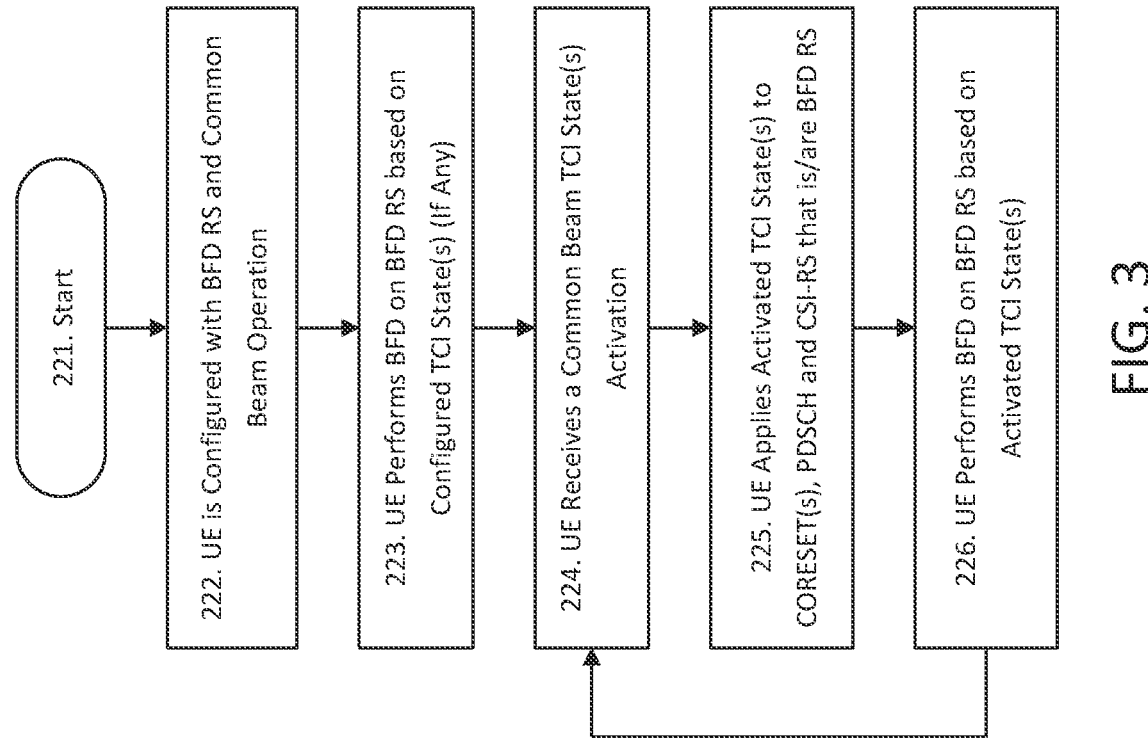
FIG. 3 illustrates an example UE procedure.

FIG. 3 illustrates an example UE procedure. At step 221, the procedure starts. At step 222, UE 202 is configured with BFD RS and common beam operation, e.g., according to various examples above. UE 202 may also be configured with a set of TCI states for common beam operation. The configuration of BFD RS may include the configuration of CSI-RS and explicit configuration of BFD RS. The configuration of CSI-RS may also include a TCI state. In step 223, UE 202 performs BFD based on the configured BFD RS(s) and corresponding configured TCI state(s). In some cases, this step is omitted, e.g., if common beam update/activation of BFD RS is configured.

In step 224, UE 202 receives a common beam TCI state(s) indication/update/activation, e.g., according to an example discussed above, e.g., in DCI or MAC CE. In step 225, UE 202 applies the received TCI state(s) to the corresponding CORESET(s), PDSCH and one or more CSI-RS that are also configured as BFD RS, e.g., according to examples discussed above. In step 226, UE 202 receives the BFD RS based on the TCI state(s) activated in step 225 and performs BFD.

Note that activation of a TCI state may also imply deactivation of another TCI state, e.g., in step 225. For example, if a first TCI state is activated and UE 202 receives and applies an activation of a second TCI state, UE 202 may activate the second TCI state and deactivate the first TCI state.

BFD—Common Beam Operation with Implicitly Configured BFD RS

Consider the case with implicitly configured BFD RS, e.g., no RS is explicitly configured as BFD RS in an active BWP. Furthermore, consider the case in which a monitored CORESET in the BWP has an activated TCI state with two source RS, e.g., one source RS for QCL-typeA and one source RS for QCL-typeD. Additionally, consider the case that the source RS with QCL-typeD is an UL RS, e.g., an SRS for BM.

In a state-of-the-art system, UE 202 may use the source RS with QCL-typeD as implicitly configured BFD RS in case the CORESET has an activated TCI state with two source RS. However, this would imply that UE 202 may use an UL RS, e.g., SRS for BM, as BFD RS. UE 202 cannot use an UL RS for BFD. Hence, a solution for this case is needed, in order to simultaneously support UL RS as QCL-typeD source RS for CORESET(s) and implicitly configured BFD RS.

Figure 4:
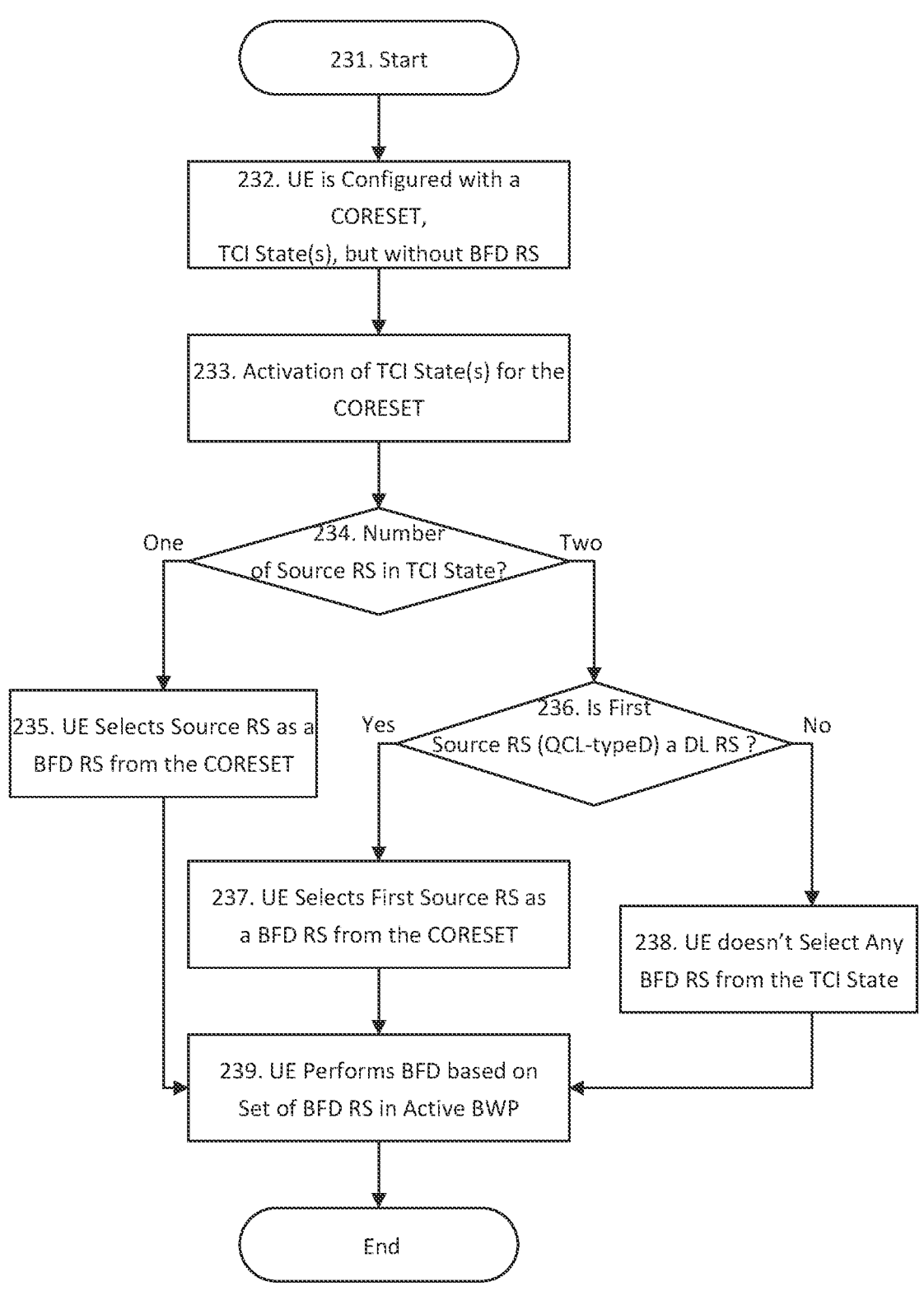
FIG. 4 illustrates an example UE procedure.

In one example, if a CORESET has a TCI state with two source RS and a first source RS with QCL-typeD is an UL RS (e.g., SRS for BM), then UE 202 does not implicitly determine a BFD RS from this CORESET. Note that UE 202 may have other CORESET(s) in the BWP from which UE 202 may implicitly determine BFD RS. An example procedure is illustrated in FIG. 4, with the following exemplary steps, of which one or more may be omitted in various variations. For simplicity, the procedure is described assuming an active DL BWP, but it can be generalized and applied to variations with multiple BWPs in a serving cell and switching between BWPs. At step 231, the procedure starts. At step 232, UE 202 is configured with one or more CORESETs, a number of TCI state(s), etc., for the BWP. At step 233, one or more TCI state(s) are activated for a CORESET in the BWP. At step 234, is the number of source RS in the activated TCI state one or two? If there are two source RS that are the same, this is counted as one source RS in some cases, and as two source RS in some cases.

With continued reference to FIG. 4, at step 235, if there is a single source RS in the activated TCI state, then UE 202 selects this RS as a BFD RS from the CORESET. In case there are multiple activated TCI states for the CORESET, UE 202 may apply steps 234-238 for each of the activated TCI states. At step 236, if there are two source RS in the activated TCI state, is the source RS with QCL-typeD (the first source RS) a DL RS? At step 237, if the first source RS is a DL RS, UE 202 selects it as a BFD RS from the CORESET. At step 238, if the first source RS is not a DL RS, e.g., it is an UL RS, then UE 202 does not select it as a BFD RS from the CORESET. Note that if a CORESET has multiple activated TCI states, UE 202 might not select any source RS as BFD RS from a first TCI state, while selecting a source RS as BFD RS from a second TCI state. At step 239, UE 202 performs BFD based on the set of selected BFD RS in the active BWP.

Figure 5:
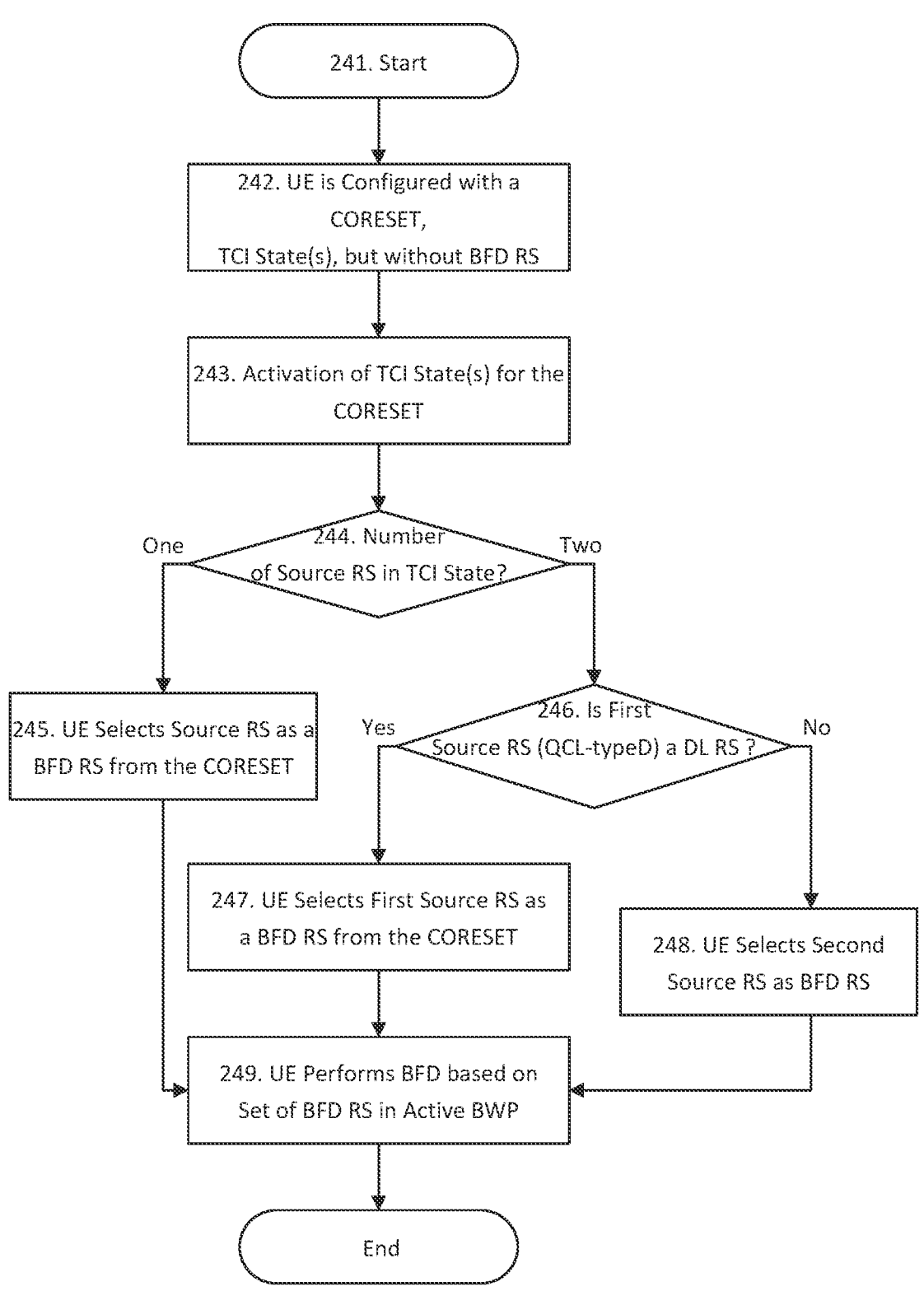
FIG. 5 illustrates an example UE procedure.

In one example, if a CORESET has a TCI state with two source RS and a first source RS with QCL-typeD is an UL RS (e.g., SRS for BM), then UE 202 implicitly determines the second source RS to be a BFD RS. The second source RS may be QCL-typeA, QCL-typeB, or QCL-typeC in various cases. The second source RS may be QCL-typeE in some cases, where QCL-typeE may be a new QCL type, e.g., as QCL-typeA but without the Doppler shift parameter. An example procedure is illustrated in FIG. 5, which includes steps 241-step 249. The steps of the procedure largely follow the example procedure in FIG. 4 described above, except step 248. At step 248, if the first source RS is not a DL RS, e.g., it's an UL RS, then UE 202 selects the second source RS, e.g., the source RS with other QCL type than QCL-typeD, as a BFD RS from the CORESET.

In one example, if a CORESET has a TCI state with two source RS and a first source RS with QCL-typeD is an UL RS (e.g., SRS for BM), then UE 202 implicitly determines the second source RS to be a BFD RS under additional condition(s). If the additional condition(s) are not met, UE 202 does not implicitly determine a BFD RS from this CORESET. Additional condition(s) may include one or more of the following: the second source RS is periodic; the second source RS is semi-persistent; the second source RS is a CSI-RS; the second source RS is not an SSB; the second source RS is a CSI-RS for BM; the second source RS is a CSI-RS for BM with parameter repetition configured; the second source RS is a CSI-RS for BM without parameter repetition configured; the second source RS is a CSI-RS, but not TRS, and without parameter repetition configured; the second source RS is a TRS; the QCL type of the second source RS is of a certain type, e.g., QCL-typeA, or QCL-typeB, or QCL-typeC, or QCL-typeE (see description above); or the first source RS is QCL-typeD source RS for the second source RS (target RS in that QCL relationship).

Figure 6:
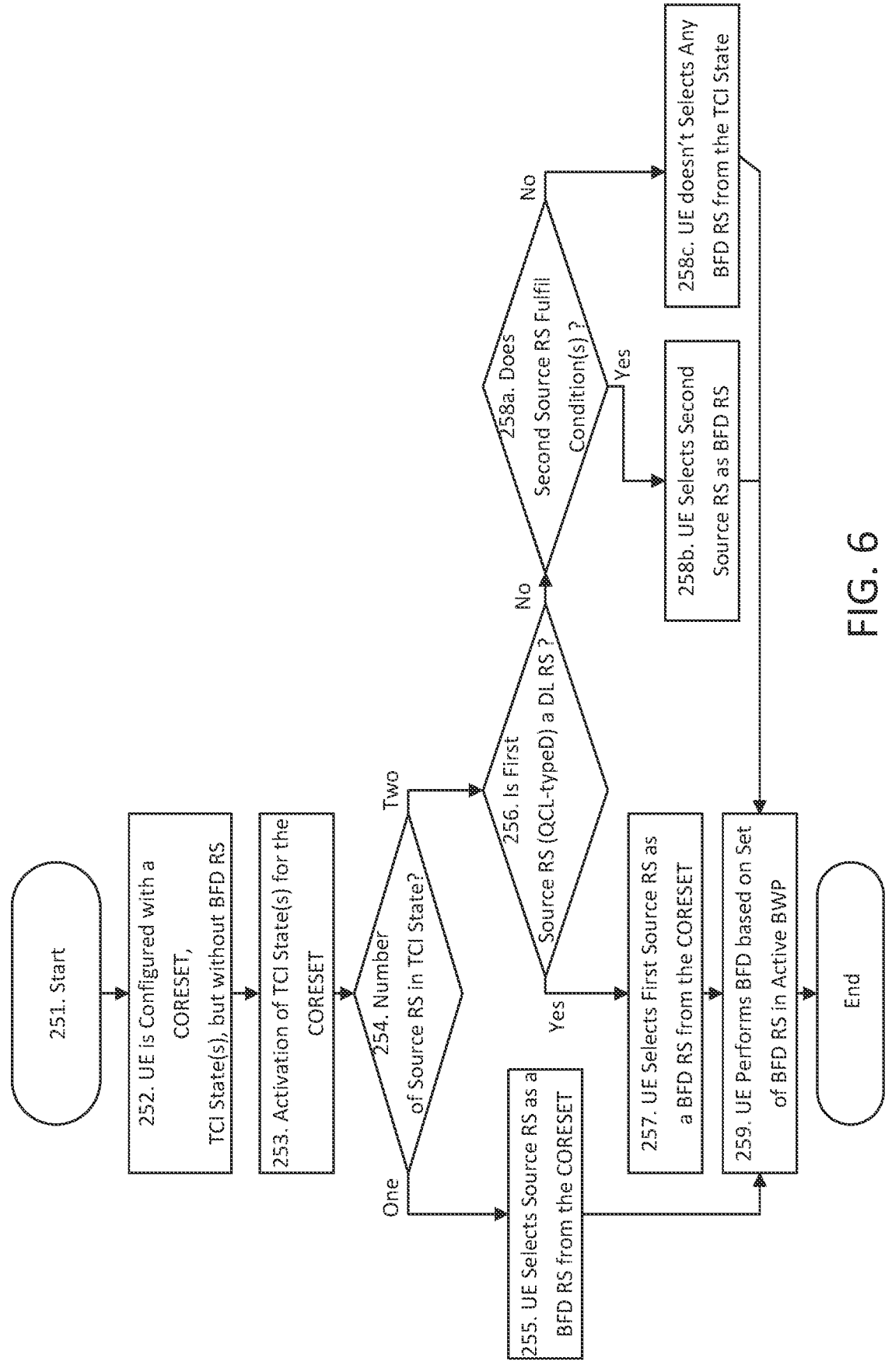
FIG. 6 illustrates an example UE procedure.

An example UE procedure is illustrated in FIG. 6 with step 251-259. The steps of the procedure largely follow the example procedure in FIG. 4 described above, except step 258. At step 258a, if the first source RS is not a DL RS, e.g., it is an UL RS, does the second source RS fulfill additional condition(s), e.g., such as listed above? At step 258b, if the second source RS fulfills additional condition(s), then UE 202 selects the second source RS, e.g., the source RS with other QCL type than QCL-typeD, as a BFD RS from the CORESET. At step 258c, if the second source RS does not fulfill additional condition(s), then the UE 202 does not select it as a BFD RS from the CORESET.

Note that UE 202 with multiple monitored CORESETs in the active BWP may select zero, one or more BFD RS from each of those CORESETs. There may be a maximum number of supported BFD RS per BWP. If the number of selected BFS RS from procedures described herein exceeds the maximum, UE 202 may omit selecting some of the RS such that the maximum is not exceeded. For example, UE 202 may select BFD RS in order of CORESET Id or in the order of TCI state ordinal position in a TCI codepoint or MAC CE.

BFD—Configuration of UL-Based BFD

UE 202 may be configured to perform DL-based BFD on a serving cell or BWP, e.g., by the configuration of BFD RS or the configuration of a BeamFailureRecoveryConfig IE or a BeamFailureRecoverySCellConfig IE.

If UE 202 is not configured with DL-based BFD, UE 202 may, e.g., under certain conditions, assume that UL-based BFD is performed by the network. Such conditions may include: UE 202 is configured with SRS for BM or UE 202 is configured with PDCCH-based BFR (see related discussion with regard to BFR for UL-based BFD). With regard to UE is configured with SRS for BM, in some cases, the SRS resource set for BM is configured for DL BM or UL-based BFD, e.g., with a parameter that indicates this. In some cases, UE behavior is different regarding SRS for DL BM and SRS for UL BM, e.g., regarding power backoff as discussed with reference to handling of MPE event.

Beam Failure Recovery (BFR) for UL-Based BFD—Introduction

In the case of UL-based BFD, the network detects beam failure based on UL RS, e.g., SRS for BM. This means that UE 202 does not know when beam failure occurs. Hence, UE 202 cannot initiate beam failure recovery. Instead, the network needs to take care of the recovery.

In some cases, the network can perform a recovery by regular reconfiguration or activation of new TCI state(s), e.g., by using another serving cell on another frequency band.

However, in some cases such as common beam operation on an SpCell, there may be no other means to reconfigure UE 202 if the serving beam link fails. Therefore, a self-contained beam failure recovery mechanism for the case with UL-based BFD may be needed.

BFR for UL-Based BFD—PDCCH-Based BFR

UE 202 is typically monitoring a small number of CORESETs on an active BWP. Each of those CORESETs may be associated with one or a small number of TCI states. The same TCI state may also be associated with multiple CORE-SETs in the BWP. For example, for common beam operation, all CORESETs in an active BWP may share the same TCI state, which may include one UL RS, e.g., SRS for BM, as source RS with QCL-typeD. Hence, there are many situations in which the network upon beam failure cannot reach UE 202 with a PDCCH on a new TCI state (beam) that the network has identified based on UL RS measurements.

In order to support recovery on more spatial domain reception filters (DL Rx beams) than those used for regular operation (data channel scheduling, etc.), it would be beneficial if the UE occasionally received PDCCH using a larger set of spatial domain reception filters, e.g., the filters corresponding to the set of SRS for BM. It wouldn't be beneficial to transmit regular PDCCH in such a way due to high overhead and potentially higher latency. Instead, it is more beneficial to use the best TCI state(s) for the CORE-SET(s) used for regular operation. The "best TCI state(s)" may be from the perspective of the network, which may estimate or predict performance metric(s) for different TCI states, e.g., based on measurements on SRS for BM, UE feedback, etc.

For simplicity of description, a few terms are introduced: Recovery PDCCH—PDCCH monitored by the UE for indication of beam failure recovery; and Recovery beams—a set of DL Rx beams used for monitoring recovery PDCCH. These terms are disclosed in more detail herein.

When the network determines that the serving beam(s) have failed such that a beam update using regular PDCCH (e.g., regular CORESET(s)/Search Space Set(s)) is not reliable enough, the network may use a recovery PDCCH.

The network may also have selected one or more new beam(s) to be used after recovery, e.g., based on measurement of UL RS, such as SRS for BM. Such one or more beam(s) may be indicated to UE 202, e.g., using a recovery PDCCH or a MAC CE in a PDSCH scheduled by a recovery PDCCH.

The recovery beams may correspond to a set of TCI states or a set of RS, which may be explicitly configured to UE 202 by the network or implicitly determined by UE 202 or a combination of explicitly configured and implicitly determined.

For example, consider a first set of beams, e.g., a set of TCI states or a set of RS. The network may explicitly configure the first set of beams, e.g., by configuring a list of TCI states or a list of RS (or RS identities). Such a list may be called a candidate beam RS list. The TCI states in a list may include UL RS as QCL-typeD source RS, e.g., SRS for BM. In some cases, the network may explicitly configure a list to include one or more RS sets (or RS set identities), e.g., one or more SRS resource sets for BM (or SRS-Resource-SetId), e.g., an SRS resource set with parameter usage configured to 'beamManagement'. The SRS for BM in listed SRS resource sets for BM may be included in the first set of beams. The configuration of an SRS resource set, e.g., for BM, may include a parameter that indicates that the SRS in the SRS resource set are to be included in the first set of beams.

The first set of beams may be implicitly determined by UE 202, e.g., by including the SRS in all or a subset of the configured SRS resource sets for BM. For example, only SRS in periodic SRS resource set are included. In another example, SRS in periodic and semi-persistent SRS resource sets are included. In yet another example, SRS in aperiodic, semi-persistent, and SRS resource sets are included.

In some cases, the set of recovery beams is the first set of beams.

In some cases, the set of recovery beams is the first set of beams with one or more beam(s) excluded. In an example, if the first set of beams comprises a set of TCI states, the set of recovery beams may exclude a set of TCI states that are activated for monitored regular CORESET(s), e.g., CORE-SET(s) corresponding to UE-specific search space sets, or common and UE-specific search space sets. In some cases, a TCI state of a source RS included in a monitored regular CORESET's TCI state may also be excluded. In some cases, any TCI state in such a TCI state chain ending in a monitored regular CORESET may be excluded. In an example, if the first set of beams comprises a set of RS, the set of recovery beams may exclude a set of source RS in TCI states (e.g., source RS with QCL-typeD) that are activated for monitored regular CORESET(s), e.g., CORESET(s) corresponding to UE-specific search space sets, or common and UE-specific search space sets. In some cases, a source RS in a TCI state of a source RS included in a monitored regular CORESET's TCI state may also be excluded. In some cases, any source RS (e.g., with QCL-typeD) in such a TCI state chain ending in a monitored regular CORESET may be excluded.

In an example, RS that are not UL RS are excluded, e.g., RS that are not SRS for BM are excluded.

Figures 7A, 7B, 7C:
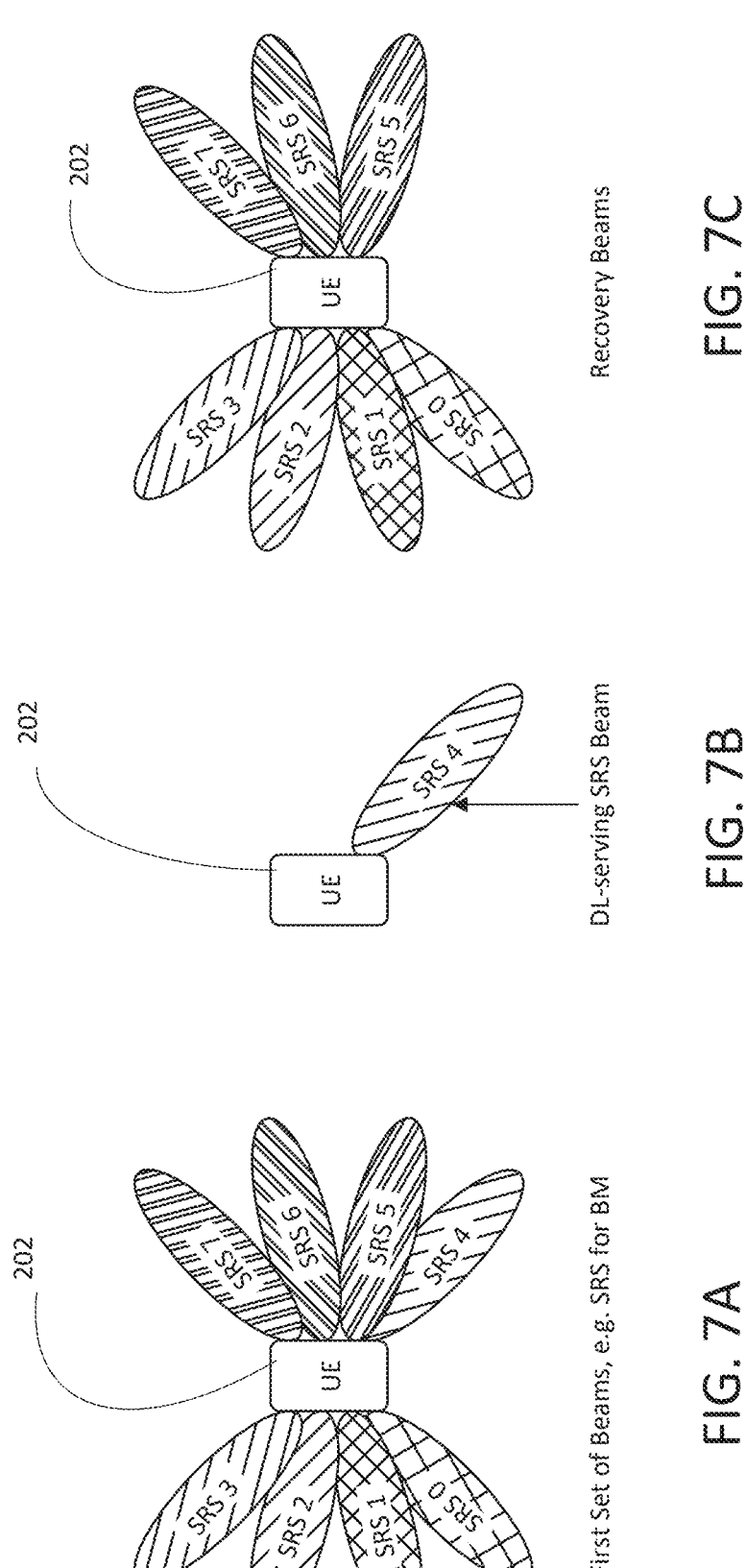
FIG. 7A illustrates an example of first set of beams.
FIG. 7B illustrates an example of serving beam.
FIG. 7C illustrates an example recovery beams.

This is illustrated in FIG. 7A-FIG. 7C, in which the first set of beams corresponds to the set of SRS for BM. One of the beams, in this case SRS 4, is used as serving beam for DL, e.g., common beam operation. The set of recovery beams excludes this serving beam. Note that there may be multiple serving beams.

Let Y be the number of recovery beams, e.g., the number of TCI states or the number of RS. UE 202 may use the Y recovery beams, e.g., as TCI state or QCL-typeD source RS, when monitoring and receiving recovery PDCCH.

UE 202 may be configured to receive PDCCH with Z TCI states in a PDCCH monitoring occasion (or with Z different QCL-typeD source RS). For Z=1, a TCI state may be associated with a PDCCH monitoring occasion. For Z>1, different sets of symbols, RBs, CCEs, REGs, REG bundles or DMRS sequences, etc. (also in various combinations) may be associated with the Z different TCI states.

In various examples, a CORESET and one or more associated search space set (SSS) are used for monitoring and receiving recovery PDCCH.

For example, UE 202 may use a first set of Z recovery beams in a first recovery PDCCH monitoring occasion, a second set (disjoint with the first set) of Z recovery beams in a second recovery PDCCH occasion, etc., in ceil(Y/Z) recovery PDCCH monitoring occasions, where ceil(x) is the ceiling function that maps x to the least integer greater than or equal to x.

Multiple SSS for Recovery

In various examples, a CORESET and W associated search space sets are used for monitoring and receiving recovery PDCCH, with W>1. In some cases, both W and Y are based on RRC configuration. In some cases, Y may change more rapidly than W, e.g., based in indication(s)/activation(s)/update(s) in DCI(s) or MAC CE. Hence, the situation that W is not equal to Y may occur. There may also be constraints on W due to other factors such as the total number of SSS, the DL/UL frame structure, available resources, etc. Various cases are discussed below.

Figure 8:
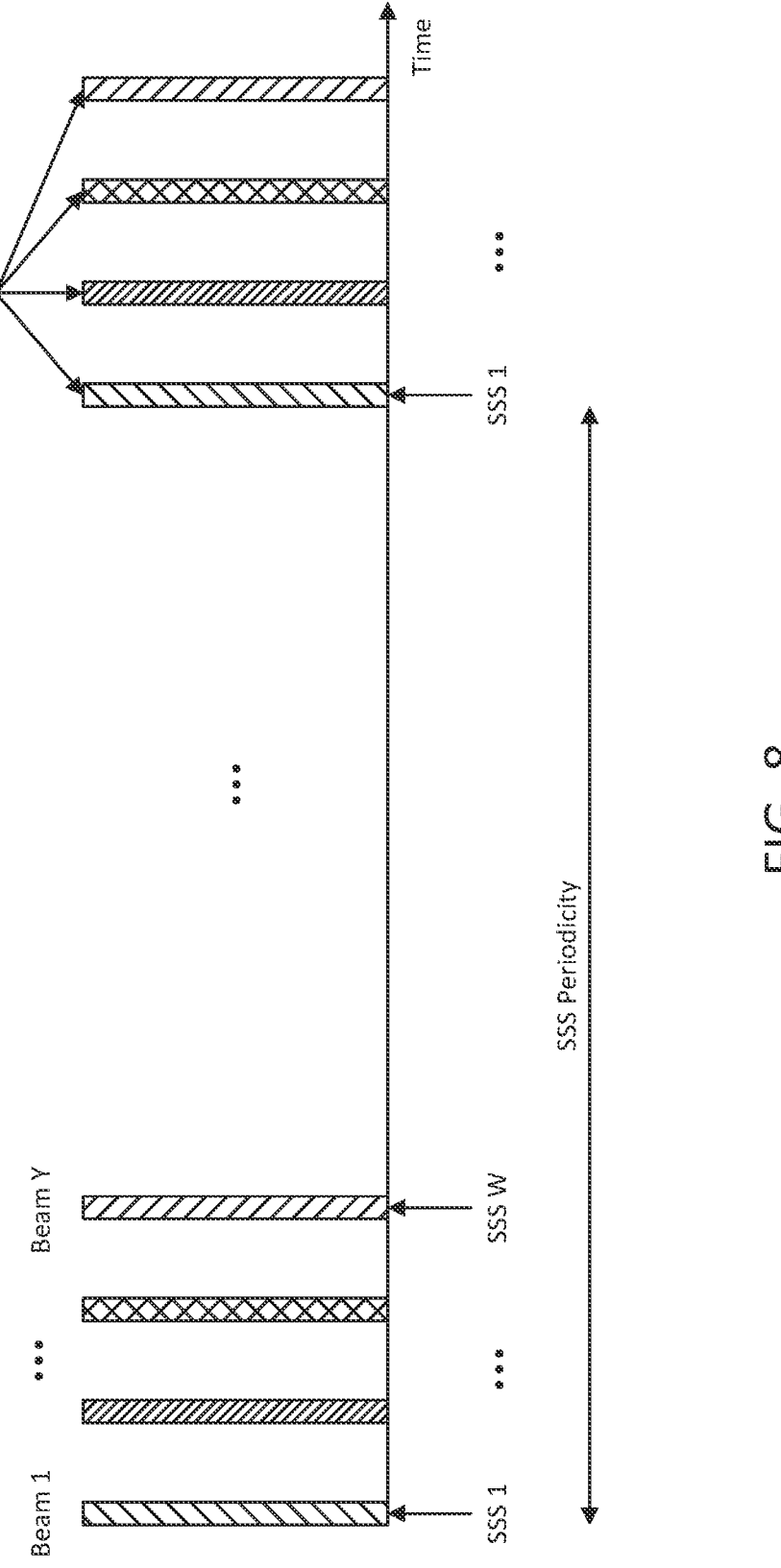
FIG. 8 illustrates an example of Y recovery beams mapped to W=Y search space sets (SSS)

In one example, W=Y and Z=1. UE 202 may assume a one-to-one mapping between the recovery beams and the SSS. This is illustrated in FIG. 8.

Figure 9:
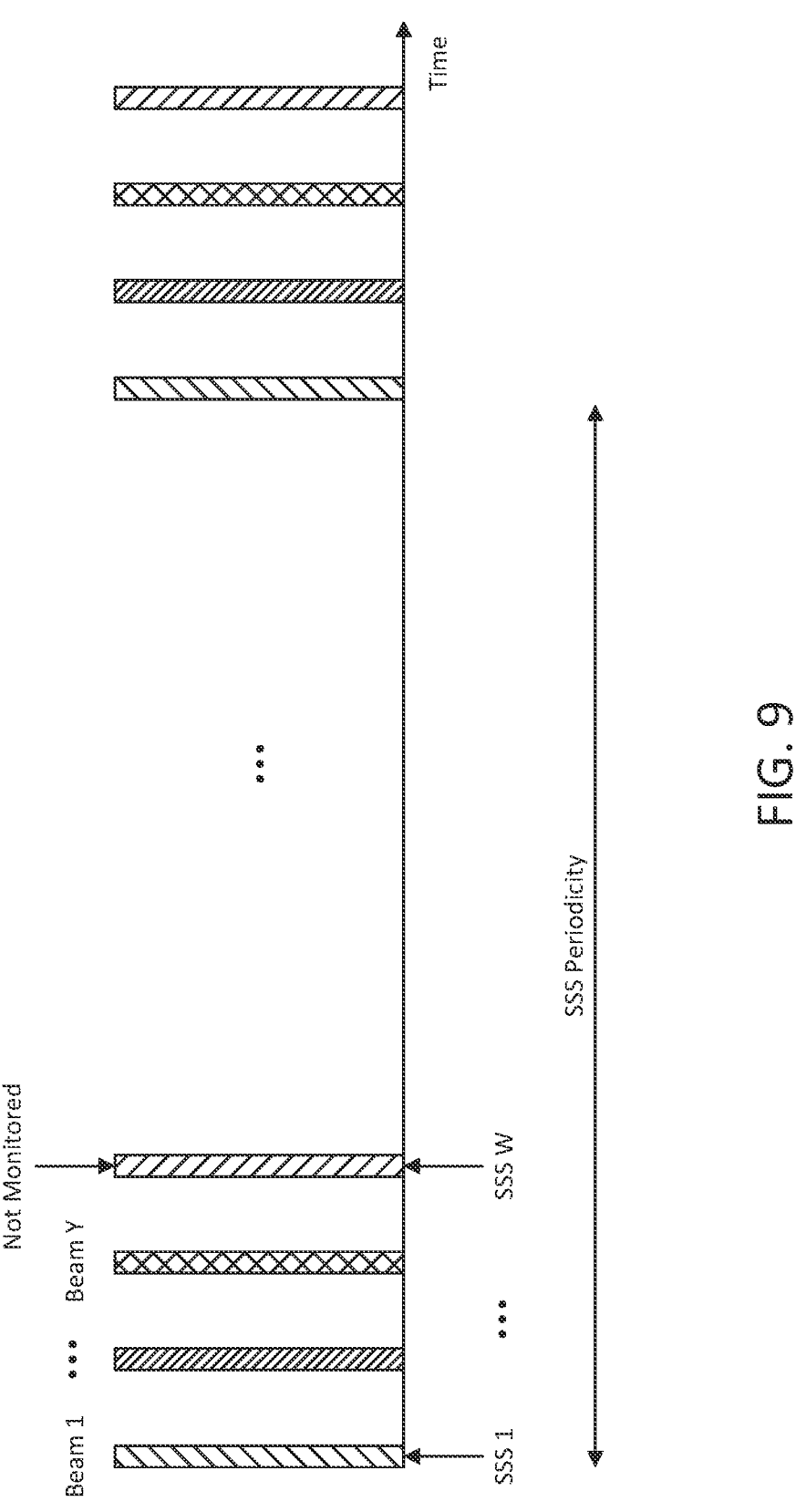
FIG. 9 illustrates an example of Y recovery beams mapped to W>Y search space sets (SSS)
Figure 10:
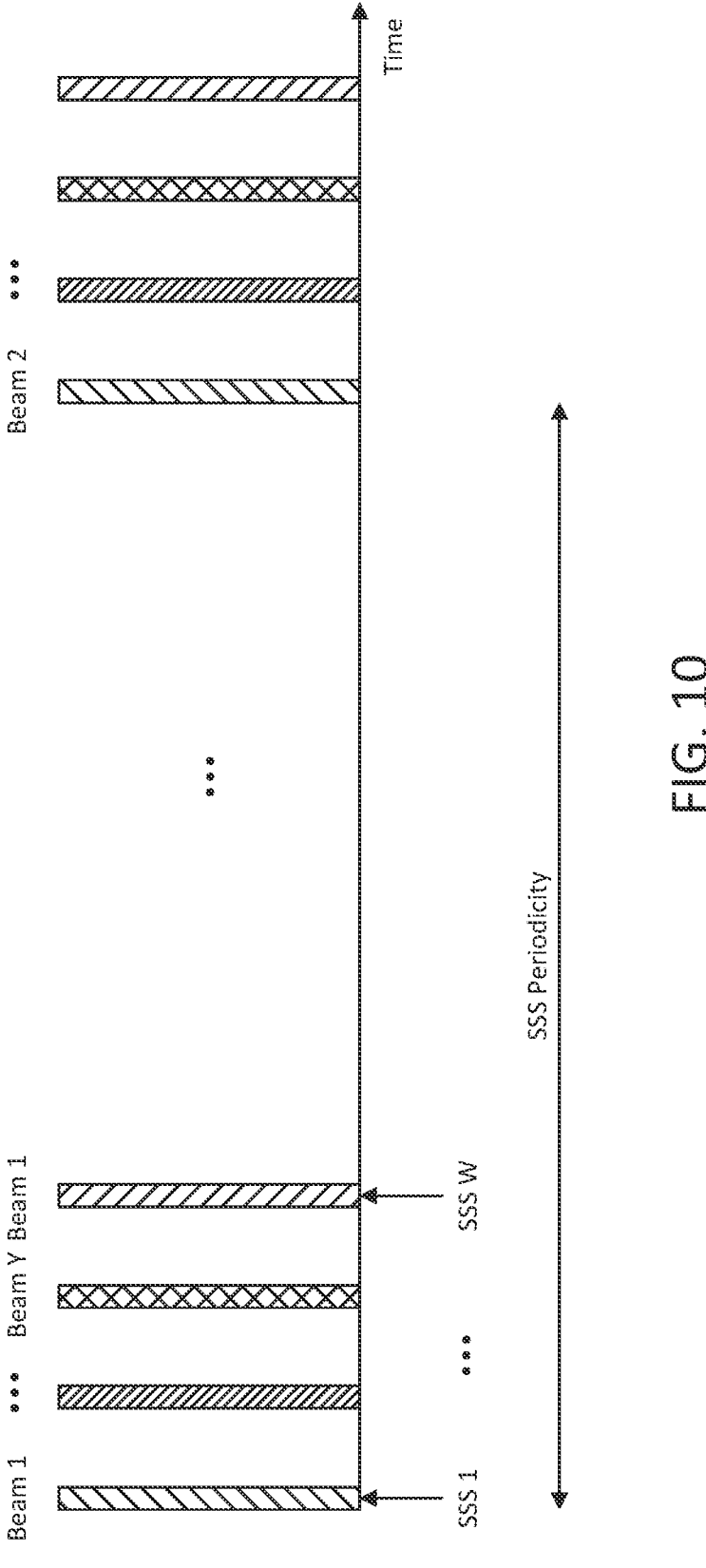
FIG. 10 illustrates an example of Y recovery beams mapped to W>Y search space sets (SSS)

In one example W>Y and Z=1. In one example, UE 202 may assume a one-to-one mapping between the Y recovery beams and Y of the W SSS, while the UE does not need to monitor the remaining W-Z SSS. This is illustrated in FIG. 9. In another example, UE 202 maps the Z recovery beams consecutively to recovery PDCCH monitoring occasions corresponding to the union of the W SSS. This is illustrated in FIG. 10.

Figure 11:
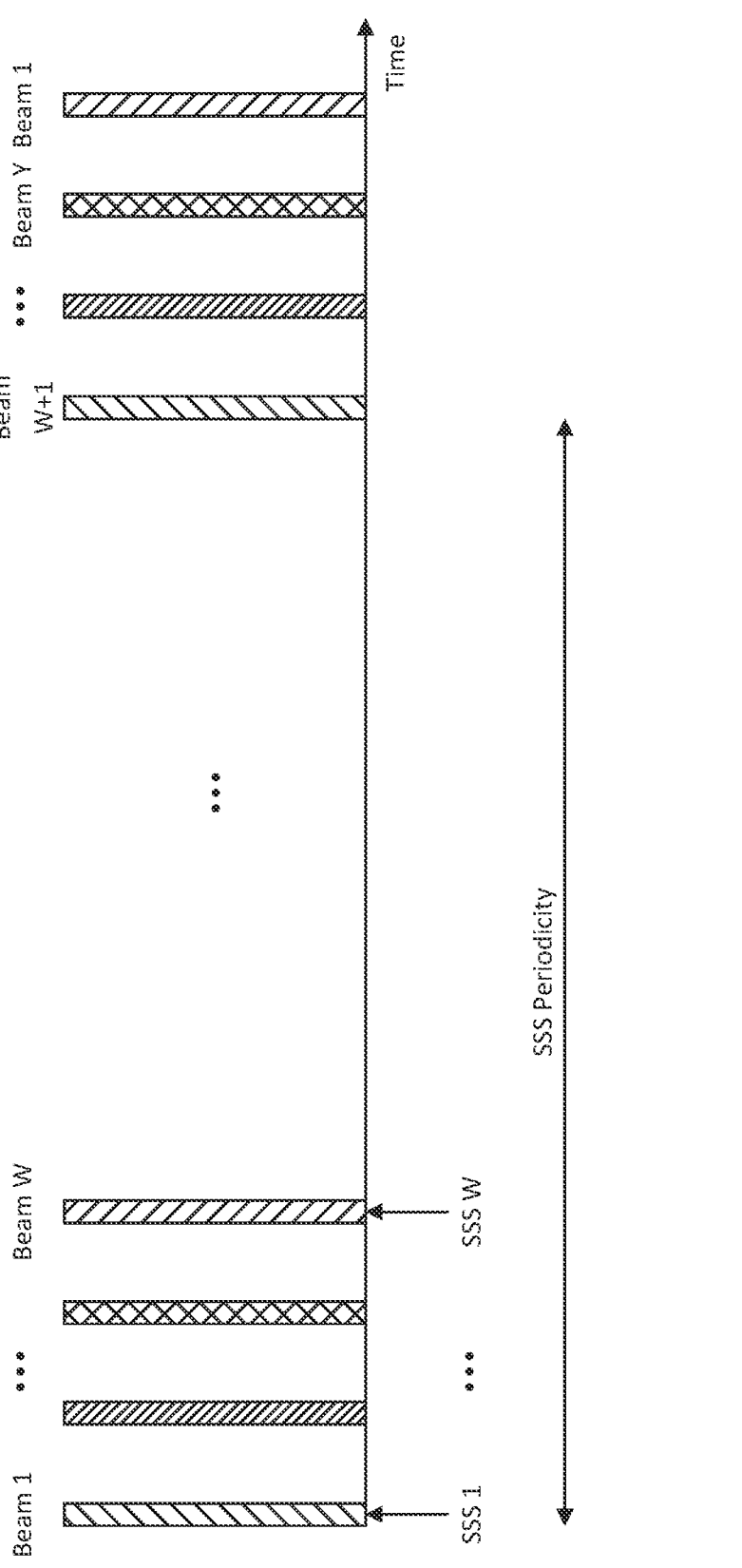
FIG. 11 illustrates an example of Y recovery beams mapped to W<Y search space sets (SSS)

In one example, W<Y and Z=1. A first set of W recovery beams can be mapped to a first set of W consecutive recovery PDCCH monitoring occasions corresponding to the union of the W SSS. Remaining recovery beams can be similarly mapped to subsequent monitoring occasions. This is illustrated in FIG. 11.

The examples in FIG. 8-FIG. 11 are readily generalized to the case with multiple beams per recovery PDCCH monitoring occasion (Z>1).

The different PDCCH monitoring occasions may be non-overlapped in time, as illustrated in FIG. 8-FIG. 11. They may also be partly of fully overlapped in time, e.g., for a UE that is capable of receiving multiple TCI states (e.g., beams) simultaneously.

The multiple SSSs may be linked by configuration, indicating that a DCI is repeated on PDCCH candidates with the same PDCCH candidate index for a certain aggregation level in the linked multiple SSSs within a slot or sub-slot or across different slots. Each of the linked SSSs may be associated with a CORESET that is activated or associated with one or more TCI states (e.g., beams).

Single SSS for Recovery

In various examples, a single SSS for recovery PDCCH monitoring is associated with a CORESET. For example, a special recovery search space can be configured for recovery PDCCH monitoring. This may for instance be configured if a legacy recovery search space (e.g., as configured by parameter recoverySearchSpaceId) is not configured. Note that the legacy recovery search space is not for monitoring recovery indication from the network (e.g., TRP 200), instead its purpose is to monitor the response to the recovery request sent by UE 202. In some cases, the legacy recovery search space (e.g., as configured by parameter recoverySearchSpaceId) is repurposed from recovery PDCCH monitoring, e.g., if another parameter is configured that enables this behavior or if DL-based BFD is not configured.

Periodic Recovery Window

In some cases, a periodic recovery window is configured. UE 202 might not need to monitor recovery PDCCH outside the recovery window. A longer periodicity gives lower UE power consumption due to fewer PDCCH blind decodes per second. However, it also gives longer beam failure recovery latency. Hence, by adopting a configurable periodicity, a periodicity that is suitable for UE 202, e.g., based on service requirements, can be selected by the network (e.g., TRP 200).

For example, a window starting time may be configured using one or more parameters, e.g., by a periodicityAndOffset parameter:

```
periodicityAndOffset CHOICE {
    sf5 INTEGER (0..4),
    sf10 INTEGER (0..9),
    sf20 INTEGER (0..19),
    sf40 INTEGER (0..39),
    sf80 INTEGER (0..79),
    sf160 INTEGER (0..159)
}.
```

Periodicity and offset are given in number of subframes (sf), for example parameter (sf5 corresponds to 5 subframe, sf10 corresponds to 10 subframes, etc).

For example, a window duration may be explicitly configured, e.g., by a duration parameter: duration ENUMERATED {sf1, sf2, sf3, sf4, sf5}.

In some cases, the window duration is not explicitly configured. Instead, it may be implicitly determined by UE 202 based on various factors or parameters.

In some cases, the window duration can be determined to be just long enough to include recovery PDCCH monitoring occasions corresponding to each recovery beam once. For example, for the case with single SSS, the window duration may be equal to the SSS periodicity times Y.

In some cases, there is no recovery window, just a recovery starting time.

In some cases, the mapping between recovery beams and PDCCH monitoring occasions is independent of the window or starting time. Instead, the mapping, e.g., of the first recovery beam to the first monitoring occasion, may start/restart at certain system frame number(s), e.g., a first recovery beam is mapped to the first recovery PDCCH monitoring occasion in system frame numbers (SFN) that fulfill (SFN mod N)=M, where N may be a fixed (e.g., 4, 8, or 16) or configurable integer, and M may be a fixed (e.g., 0) or configurable integer. The following recovery beams may then be consecutively mapped to subsequent recovery PDCCH monitoring occasions.

Figure 12:
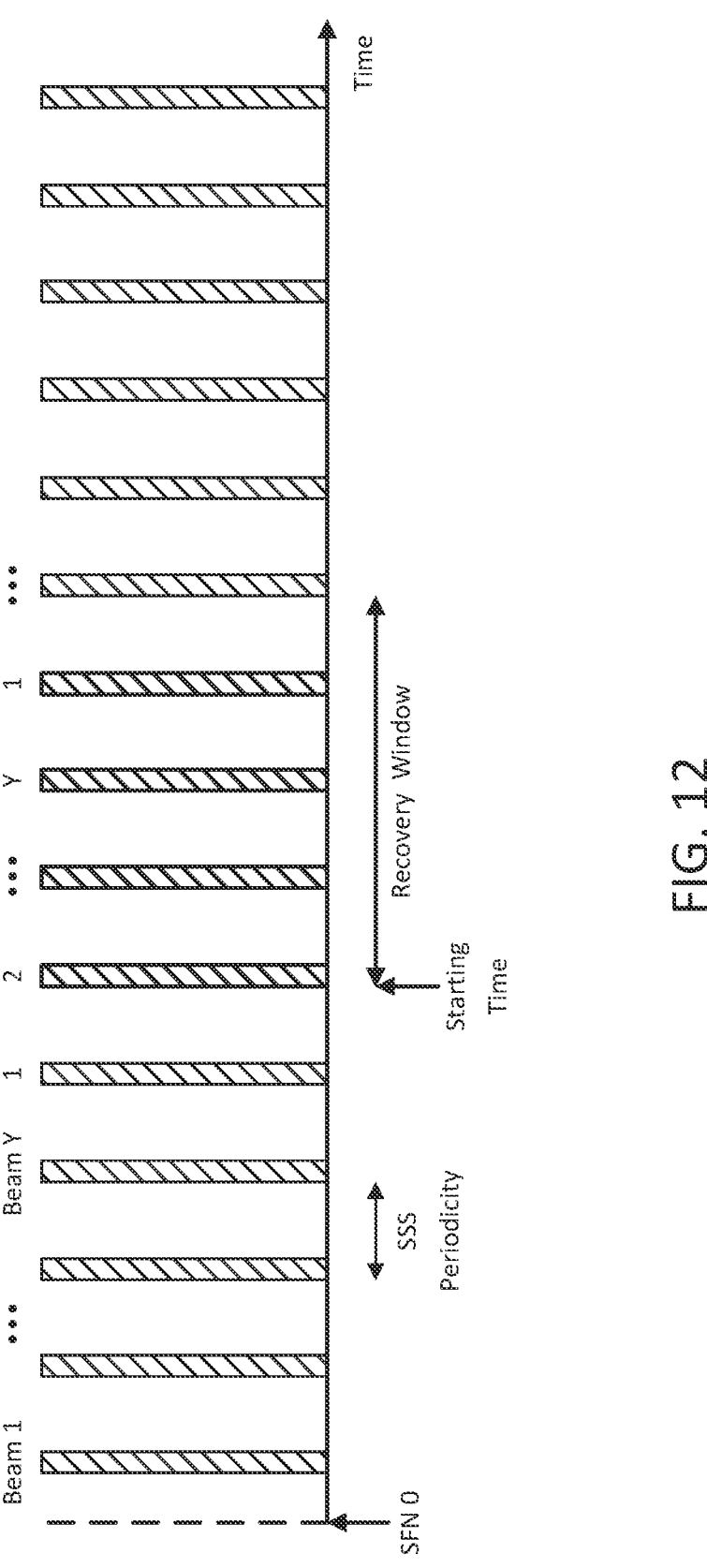
FIG. 12 illustrates an example of mapping independent of recovery window or starting time.

This is illustrated in FIG. 12, in which mapping starts at SFN 0 and UE 202 monitors the recovery SSS during the recovery window or after the starting time (starting with recovery beam 2).

In some cases, the mapping between recovery beams and PDCCH monitoring occasions depends on the recovery window or starting time. For example, the first recovery beam may be mapped to the first monitoring occasion in the window or after the starting time. The following recovery beams may then be consecutively mapped to subsequent recovery PDCCH monitoring occasions.

Figure 13:
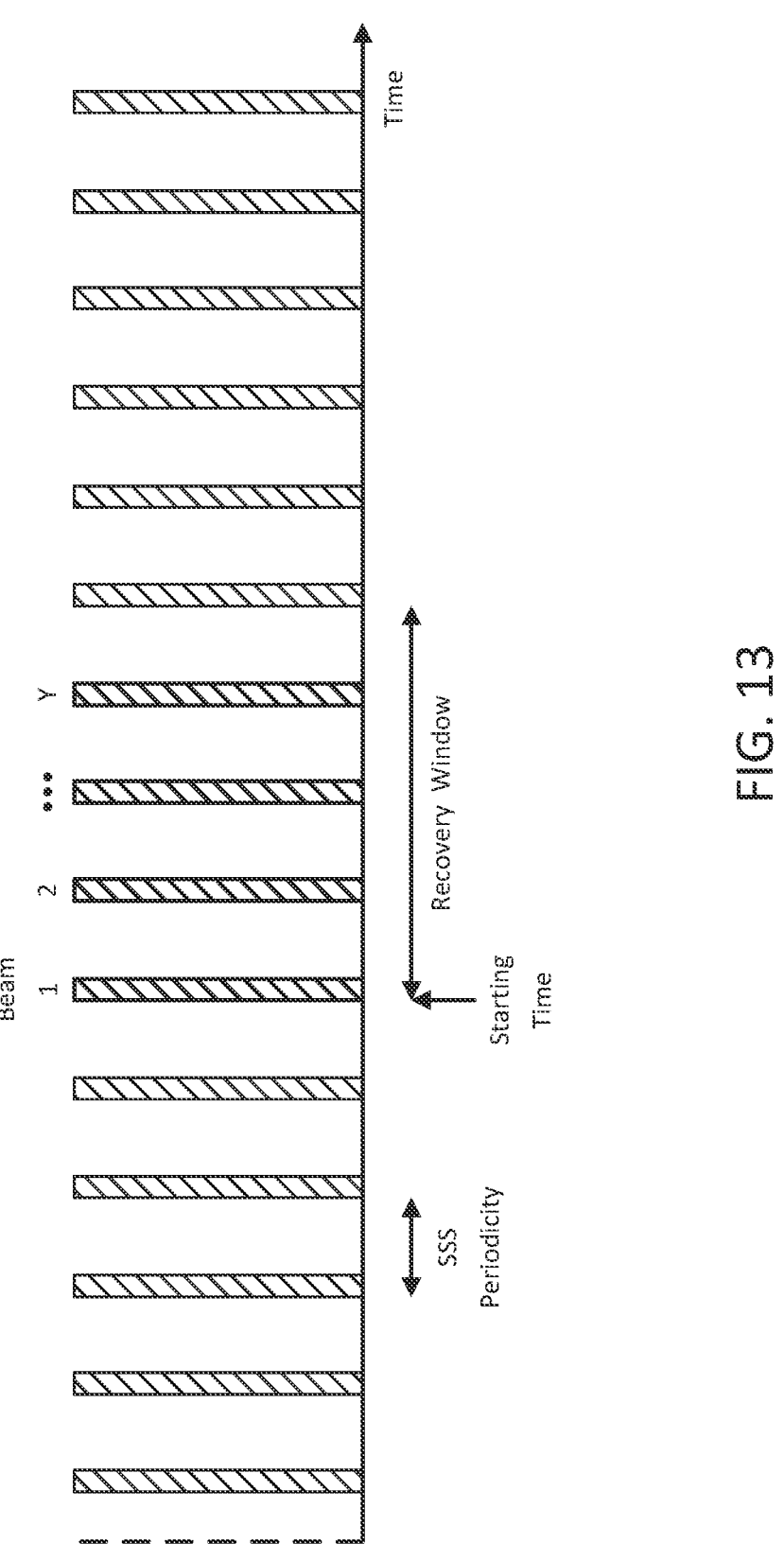
FIG. 13 illustrates an example of mapping dependent of recovery window or starting time.

This is illustrated in FIG. 13, in which the first recovery beam is mapped to the first recovery PDCCH monitoring occasion in the recovery window or after the starting time.

There may be multiple recovery PDCCH candidates during some time period, e.g., a recovery window. UE 202 may apply different receive beams for these different recovery PDCCH candidates.

In some cases, UE 202 may assume that if there is a beam failure, the network would transmit recovery PDCCHs on the multiple PDCCH candidates, e.g., corresponding to different UE receive beams. In some cases, UE 202 may combine, e.g., soft combine, different PDCCH candidates for increased performance.

In some cases, UE 202 may not assume that if there is a beam failure, the network would transmit recovery PDCCHs on the multiple PDCCH candidates. Instead, the network may transmit recovery PDCCH(s) for a subset of the recovery beams, e.g., one or two recovery PDCCH(s). The subset of recovery beams may correspond to new beam(s) selected by the network, e.g., based on measurement of UL RS. Since UE 202 might not know which subset the network selects, UE 202 may not be able to combine recovery PDCCHs across recovery beams.

It can be expected that the recovery occurs relatively rarely. Therefore, it may be worthwhile to sacrifice recovery PDCCH scheduling flexibility for lower UE power consumption. This could mean to configure a low number of PDCCH candidates per monitoring occasions, perhaps even a single PDCCH candidate. For all the occasions in which a recovery PDCCH is not transmitted, there is no impact on scheduling flexibility of other channels/signals, but the UE power consumption is reduced. For the rare occasion in which a recovery PDCCH is actually transmitted, the single decoded PDCCH candidate may reduce scheduling flexibility for other channels/signals somewhat.

One solution to reduce recovery PDCCH monitoring power consumption is to start the monitoring upon the expiry of a timer, which may have a configurable expiration time. The timer may be reset when UE 202 successfully receives a DL transmission, e.g., e.g., a PDCCH or either a PDCCH or a PDSCH, This may be indicative of working beams. In case of beam failure, the UE might not correctly decode DCIs in PDCCHs were transmitted on failed beams.

For the case that a channel or signal (e.g., PDSCH, PUSCH, etc.) is scheduled in a way that collides with a recovery PDCCH, e.g., if they collide in time and the QCL-typeD differs, it may be reasonable to prioritize the reception of the scheduled channel/signal. The reason is that the successful scheduling is evidence that there is no current beam failure.

BFR for UL-Based BFD—SSB-Assisted and TRS-Assisted PDCCH-Based BFR

Figure 14:
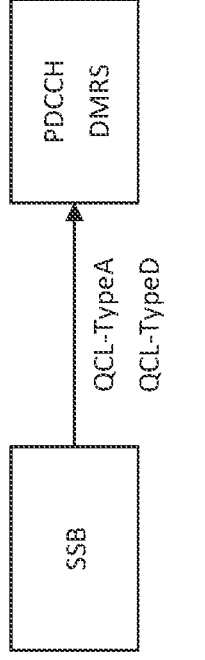
FIG. 14 illustrates an example QCL relationship with a synchronization signal block (SSB) as both QCL-TypeA and QCL-TypeD (if applicable) source for physical downlink control channel (PDCCH) demodulation RS (DMRS)

In various cases, UE 202 may use an SSB for time/frequency synchronization prior to PDCCH reception, such as in IDLE mode. UE 202 may for example assume QCL between an SSB and PDCCH DMRS in terms of average gain, QCL-typeA and QCL-typeD, if applicable, as illustrated in FIG. 14.

In various cases, a PDCCH DMRS may be QCL-typeA with a TRS, such as in CONNECTED mode. TRS-assisted PDCCH reception offers better performance than SSB-assisted due to improved time-frequency tracking, etc.

SSB-Assisted PDCCH-Based BFR

For SSB-assisted PDCCH-based BFR, there are several potential solutions.

Figure 15:
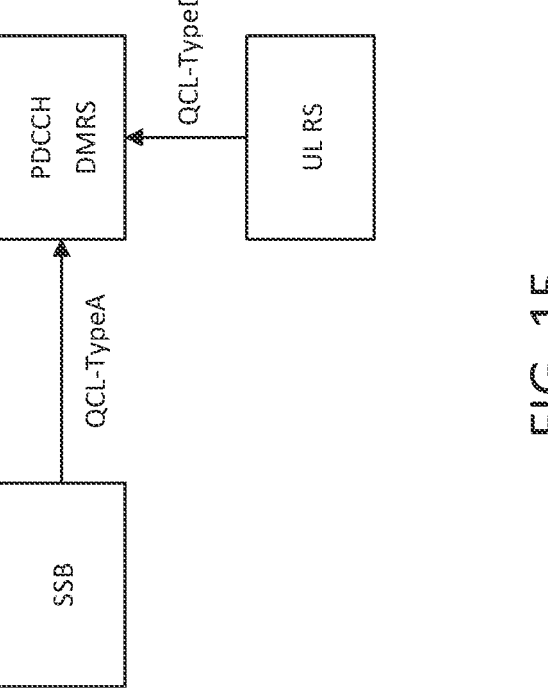
FIG. 15 illustrates an example QCL relationship with an SSB as QCL-TypeA and an UL RS as QCL-TypeD source for PDCCH DMRS.

In some cases, the set of recovery beams may be represented by a set of TCI states. One such TCI state may include two source RS, e.g., an UL RS (e.g., SRS for BM) as QCL-typeD source RS and an SSB. The source SSB may be for instance QCL-typeA or QCL-typeC, as illustrated in FIG. 15. Such a scheme may rely on rather frequent update or reconfiguration of the set of recovery beam TCI states.

In some cases, the set of recovery beams may be represented by a set of UL RS (e.g., SRS for BM), which may provide QCL-typeD to the recovery PDCCH. For QCL-typeA or QCL-typeC, UE 202 may select an SSB for the corresponding UL RS. In other words, for a first recovery beam, UE 202 may select a first SSB and for a second recovery beam, UE 202 may select a second SSB. The SSB selection may be based on SSB RSRP measurement using different recovery beams.

This may be a reasonable approach if its assumed that the DL Tx beam for a recovery PDCCH DMRS that matches a particular DL Rx beam (a recovery beam) is likely to be QCL with a suitable SSB (e.g., the strongest SSB) received on the DL Rx beam (the recovery beam). Note that the network is likely to perform measurements based on the transmitted recovery beams, e.g., the corresponding UL RS, and may select a DL Tx beam for a recovery PDCCH that matches the particular recovery beam.

Figure 16:
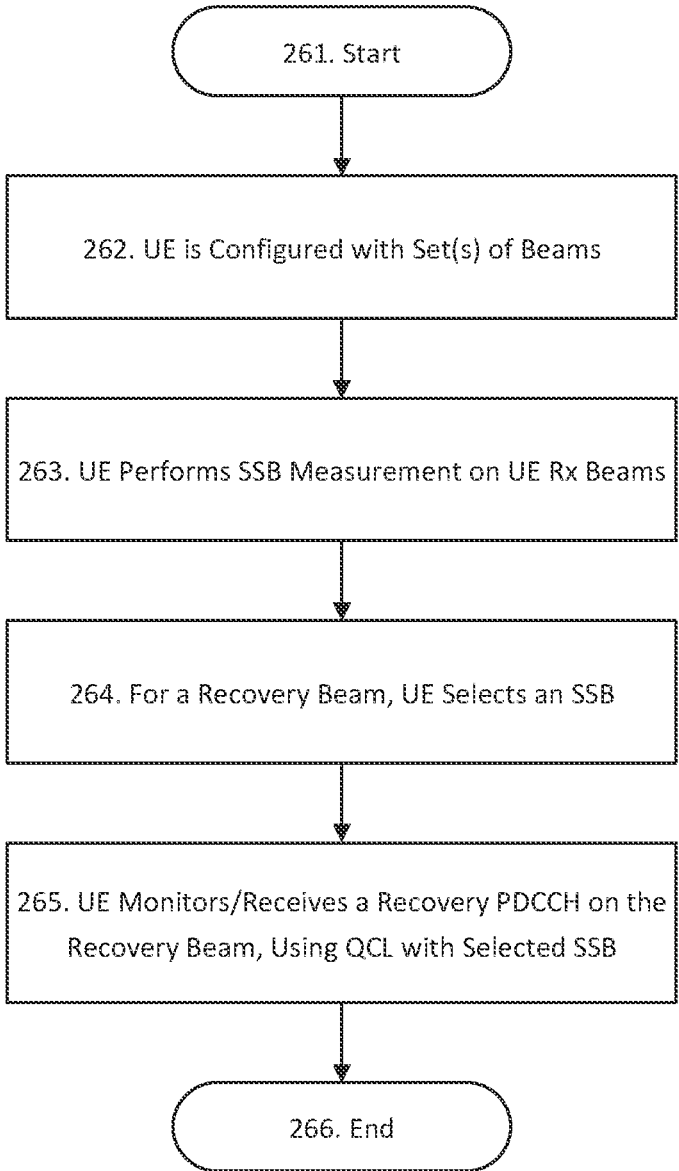
FIG. 16 illustrates an example UE procedure.

This procedure is illustrated in FIG. 16. At step 261: The procedure starts. At step 262, UE 202 is configured with a set of beams, or multiple sets of beams. The set may be a first set of beams, which may be the same as the set of recovery beams. The set may be a first set of beams and a set of recovery beams, which may be a subset of the first set. At step 263, SSB measurements are performed, e.g., SSB RSRP, using the set(s) of beams as UE Rx beam. For example, the UE measures SSBs using the recovery beams as UE Rx beams. At step 264, for a monitored recovery PDCCH that is associated with a recovery beam, e.g., has the corresponding UL RS as QCL-typeD source RS, UE selects an SSB to be used as additional QCL source (e.g., QCL-typeA or QCL-typeC), for instance based on the SSB measurements in the previous step. At step 265, for a monitored recovery PDCCH that is associated with a recovery beam and that has a selected SSB as additional QCL source, UE 202 applies the recovery beam as QCL-typeD source and the SSB as additional QCL source during reception or processing. At step 266, the procedure ends.

Note that step 264 and step 265 may be performed for each monitored recovery PDCCH that is associated with a recovery beam based on an UL RS.

TRS-Assisted PDCCH-based BFR

Additional TRS may improve the performance of recovery PDCCH.

Figure 17:
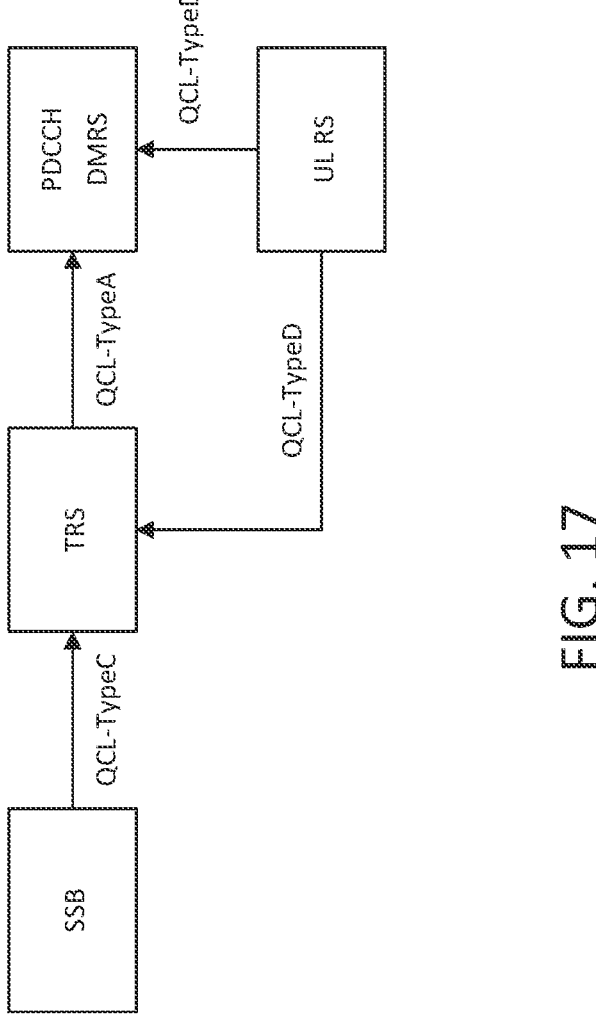
FIG. 17 illustrates an example QCL relationship with a TRS as QCL-TypeA and an UL RS as QCL-TypeD source for PDCCH DMRS. The TRS has an SSB and the UL RS as QCL sources.

UE 202 may be configured with a set of TRS, where, in some cases, each TRS is associated to a recovery beam or where each TRS is associated to a beam from a first set of beams (e.g., all SRS for BM used for DL BM). The association between TRS and recovery beam may be that the TRS has the recovery beam (e.g., corresponding UL RS) as QCL-typeD source RS. Each of those TRS may have an additional source RS, e.g., an SSB with QCL-typeC, as illustrated in FIG. 17. Since the number of combinations of SSB and recovery beam is large, the network may need to either configure a large number of TRS (covering many or all combinations) or configure a smaller number of TRS (not covering many combinations) and rely on reconfiguration of TRS TCI states as the network determines (e.g., through UL RS measurement or UE feedback) that different sets of SSBs become usable for the UE.

In some cases, UE 202 may be configured with a set of TRS, in which a TRS may have an SSB as both QCL-typeC and, if applicable, QCL-typeD source. In this case, the network may configure one TRS per SSB and configure the one-to-one QCL relationship between SSB and TRS. Note that the TRS may be transmitted with a narrower beam than the corresponding SSB that QCL-typeC and, if applicable, QCL-typeD source. For this case, the solutions described above for SSB-assisted BFR may be applicable, e.g., as in FIG. 16, since if UE 202 selects an SSB for a recovery PDCCH, it also indirectly selects a TRS. The network can make sure to transmit the TRS and the corresponding recovery PDCCH using the same DL spatial domain transmission filter.

Figure 19:
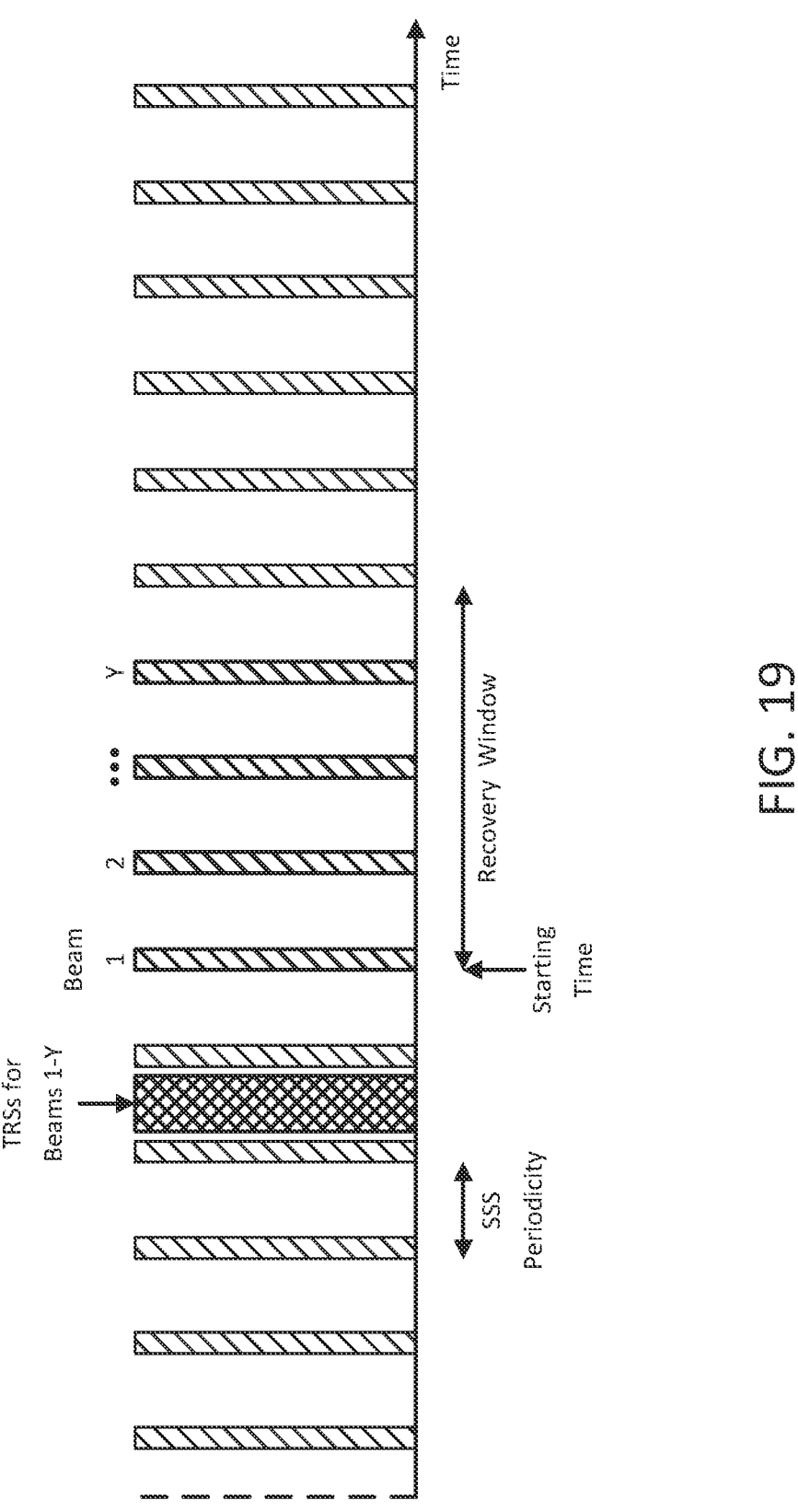
FIG. 19 illustrates an example of TRS prior to recovery PDCCHs.

The periodicity of a TRS may be equal or shorter than the periodicity of the corresponding recovery PDCCH, e.g., the recovery PDCCH associated with the same recovery beam. The offset may preferably be such that the TRS precedes the recovery PDCCH with sufficient time margin for UE 202 to receive and process the TRS prior to recovery PDCCH reception. This is illustrated in FIG. 19.

The TRSs for recovery PDCCHs may be dedicated to recovery PDCCH. Hence, they can be called recovery TRS.

The recovery TRSs might not need to be transmitted by the network during normal circumstances when no beam failure is detected by the network, since no recovery PDCCH is transmitted. In such circumstances, the resources occupied by recovery TRSs and recovery PDCCH can be granted to other transmissions, such as other PDCCH and PDSCH.

Figure 20:
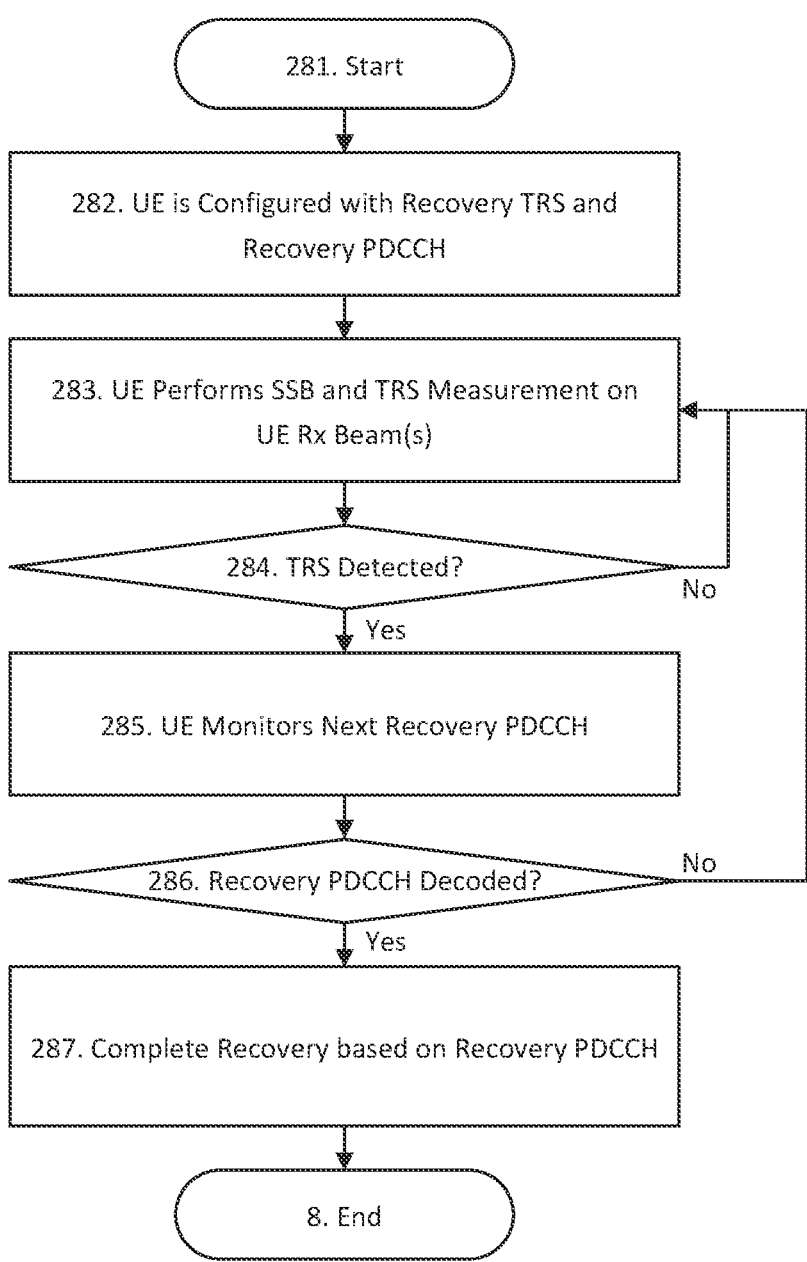
FIG. 20 illustrates an example UE procedure.

Hence, the presence of a recovery TRS could indicate beam failure to UE 202. The presence of a recovery TRS could also indicate the presence of the corresponding recovery PDCCH. Such TRS-based recovery detection could be more power efficient for UEs, since only TRS detection (and not PDCCH reception and decoding) is required during normal circumstances. An example procedure is shown in FIG. 20. At step 281, UE procedure starts. At step 282, UE is configured with recovery TRS, recovery PDCCH, TCI states, UL RS (e.g., SRS for BM), etc. At step 283, UE performs measurements, e.g., SSB and TRS. The measurement of recovery TRS is using corresponding UE Rx beam (e.g., corresponding to UL RS) that is also used for recovery PDCCH. At step 284, UE determines if a recovery TRS is detected in a TRS transmission occasion. If no recovery TRS is detected, the UE may skip recovery PDCCH reception until the next recovery TRS transmission occasion and go back to step 283.

With continued reference to FIG. 20, at step 285, if a recovery TRS is detected, UE 202 receives and tries to decode at least the next recovery PDCCH corresponding to the detected TRS. In some cases, UE 202 receives and tries to decode the next recovery PDCCHs also corresponding to other recovery beams. At step 286, if no recovery PDCCH is successfully decoded, UE 202 may determine that no beam failure occurred and return to TRS measurements in step 283. At step 287, if a recovery PDCCH is successfully decoded, UE 202 proceeds with the recovery based on the successfully decoded PDCCH (and potentially subsequent transmissions, e.g., MAC CE in PDSCH) and completes recovery. At step 288, procedure ends.

The figure describes one failure and recovery. Note that as a recovery has completed, UE 202 may return to recovery TRS detection and PDCCH decoding, e.g., based on updated set(s) of beams, etc.

TRS detection may be based on energy detection of the TRS. If the TRS energy (e.g., per RE) is above a threshold, TRS is detected. If the TRS energy is below (or equal to) a threshold, TRS is not detected. A threshold may be configurable or predefined. It may be absolute or described in relation to the energy of the corresponding SSB. For instance, a TRS is detected if TRS energy (e.g., per RE) is at least A dB above/below the corresponding SSB energy (e.g., per RS).

BFR for UL-Based BFD—Event-Based or Conditional SRS Transmission

In another alternative, UE 202 is configured with semi-persistent or aperiodic UL RS, e.g., SRS for BM, which may be activated or triggered by UE 202 in case of an event. Also, the event and the related parameters may be configurable. The event may a UE-detected beam failure, e.g., based on DL RS (BFD RS), or an event that the RSRP (L1-RSRP or L3-RSRP), RSRQ (e.g., L3-RSRQ), or SINR (e.g., L1-SINR or L3-SINR), of a DL RS, e.g., SSB, falls below a certain threshold, which may be configurable. In some cases, such an event and the subsequent SRS transmission may be followed by monitoring of corresponding recovery PDCCH, e.g., as described above. In some cases, UE 202 may stop transmitting the UL RS in another event, e.g., that the measurement result is above a threshold, which may be different than the threshold to start UL RS transmission, e.g., stopping threshold is the starting threshold plus an offset (e.g., hysteresis), e.g., in dB or dBm. In some cases, there may be an association between DL RSs, e.g., SSBs, CSI-RS, and UL RSs, e.g., SRS resources in an SRS resource set for BM. In the case of an event, UE 202 may select one or more DL RS, e.g., one or more candidate beam RS, and transmit one or more UL RS associated with the DL RS. In this way, UE 202 may indicate one or more DL RS to the network, e.g., a set of preferred beams.

In some cases, UE 202 transmits a set of UL RS, e.g., SRS for BM, in the case of an event, without prior selection. In such a scheme, the network may detect the occurrence of an event and use the transmitted UL RS for measurement and selection.

Enhanced Multi-RS TCI-State—Introduction

The RSs and TCI states for DL BM based on UL RS may involve substantial TRS overhead or reconfiguration overhead as UE 202 moves through the cell, for example TRS TCI state reconfiguration overhead or PDCCH/PDSCH TCI state set reconfiguration, as also discussed with reference to BFR for UL-based BFD. In particular, considering the goal of overhead reduction by common beam operation, further enhancements are motivated.

Common beam operation attempts to reduce overhead and simplify beam management by using the same beam for both control and data, e.g., PDCCH and PDSCH if DL is considered. Note that common beam operation may include multi-beam operation, e.g., the same multiple beams are used for control and data. However, the single beam (e.g., single TCI state) case is mostly considered here for simplicity of presentation, but the enhancements are equally applicable to the multi-beam case.

In a first example, the network (e.g., TRP 200) may configure UE 202 with many TRSs, with a one-to-one QCL mapping between different TRSs and each SSBs. In this case, there may exist a large number of combinations of QCL source RS, e.g., all combinations of TRS (for QCL-typeA) and SRS (for QCL-typeD), in the TCI-states for PDCCH and PDSCH. Since the number of TCI states that can be configured for UE 202 in a BWP is limited, RRC reconfiguration of TCI states for PDCCH/PDSCH may be necessary as UE 202 moves about the cell.

In a second example, the network (e.g., TRP 200) can configure a smaller set of TRSs, fewer than the number of SSBs, and rely on RRC reconfiguration of the QCL source(s) of the TRSs as UE 202 moves about the cell. It should be noted that since TRS is a periodic CSI-RS, dynamic update of TCI state is not supported, only RRC reconfiguration. For example, the same number of TRSs as the number of SRS for BM may be configured for UE 202. The second example configures fewer TRSs than the first example but may require more frequent RRC reconfigurations of TRS or TCI states.

The examples above illustrate that TRS operation in a multi-beam scenario involves large excessive configurations and reconfiguration overhead. In the light of the effort to streamline beam operation for control and data with the common beam approach, the beam management for TRS should also be streamlined in terms of RS and reconfiguration overhead.

Enhanced Multi-RS TCI-State—TRS Association with PDCCH

The association of an RS, e.g., TRS or CSI-RS for BM, and PDCCH, e.g., one or more CORESET(s), is considered here, for the purpose of enhanced beam management. The RS may for example be associated with all or a subset of the CORESETs in a BWP, all or a subset of the CORESETs in a cell, all or a subset of the CORESETs in a list of cells. The RS may also be associated with PDSCH, e.g., when PDSCH shares the QCL assumptions (e.g., TCI state) with PDCCH (e.g., via CORESET(s)) such as in common beam operation. In some cases, the PDSCH shares the QCL assumption of a subset of CORESETs, e.g., CORESETs sharing the same CORESET pool index as the CORESET that was used to schedule or activate the PDSCH. In some cases, the associated RS and corresponding one or two QCL types are included in a TCI state. In some cases, the associated RS is a periodic NZP CSI-RS that is not configured with a TCI state. For simplicity of description, the case with association between TRS and CORESET(s) is considered here.

Figure 21:
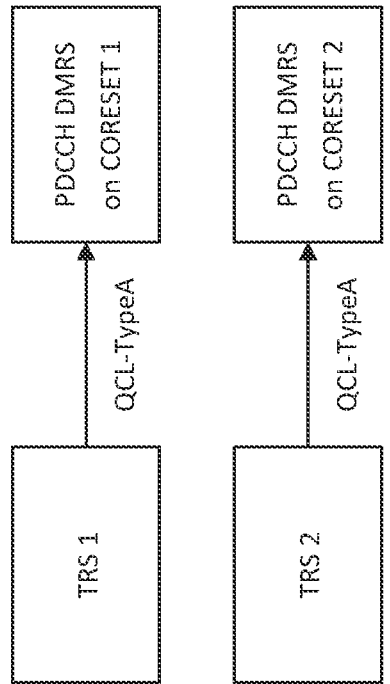
FIG. 21 illustrates an example of association of two TRS with two CORESETs.

For example, consider a case with two TRS and two CORESETs in a BWP, as illustrated in FIG. 21. The association may imply that the associated TRS is a QCL source RS to PDCCH DMRS transmitted on the corresponding CORESET, e.g., QCL-TypeA.

Figure 22:
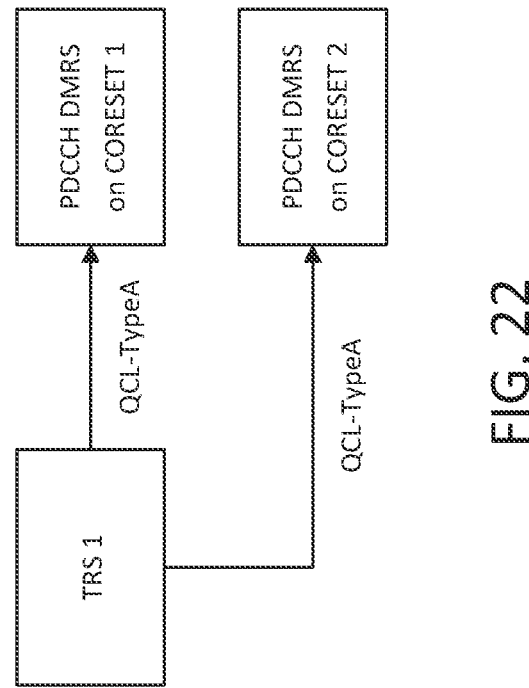
FIG. 22 illustrates an example of association of a TRS with two CORESETs.

In another example, consider a case with one TRS associated with two CORESETs in a BWP, as illustrated in FIG. 22.

The association may be achieved with an optional parameter in the CORESET IE that configures an associated NZP CSI-RS resource, which may be constrained to be a (part of) TRS or CSI-RS for BM.

The configuration of such an associated RS may imply that the RS is a source RS for a certain QCL type, e.g., QCL-typeA, for the CORESET. In some cases, the QCL type of this associated RS is also configured in the CORE-SET IE.

Figure 18:
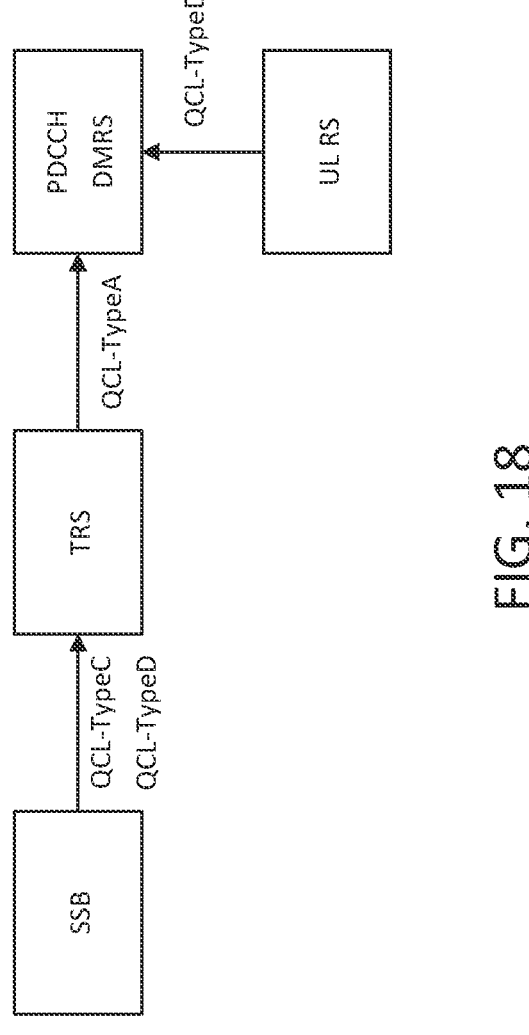
FIG. 18 illustrates an example QCL relationship with a tracking reference signals (TRS) as QCL-TypeA and an UL RS as QCL-TypeD source for PDCCH DMRS. The TRS has only an SSB as QCL source.

It may also be configured if a) the associated RS can have a single QCL source RS, e.g., the same SSB for both QCL-typeC and QCL-typeD, if applicable; or b) the associated RS can have two QCL source RSs, e.g., an SSB for QCL-typeC and the QCL-typeD source RS, if applicable, as the associated CORESET. These two cases are illustrated in FIG. 17 and FIG. 18.

For the case that an RS, e.g., TRS, is associated with multiple CORESETs and case b) is used, there may be a constraint that the associated CORESETs have the same QCL-typeD source RS. This may for example be achieved if common beam operation is used. For example, a single RS, e.g., TRS, may be associated with all CORESETs in a BWP for which a common QCL-typeD source RS is used, which may be all or a subset of the CORESETs in a BWP (the subset may be the CORESETs in a BWP with the same CORESET pool index value).

Figure 23:
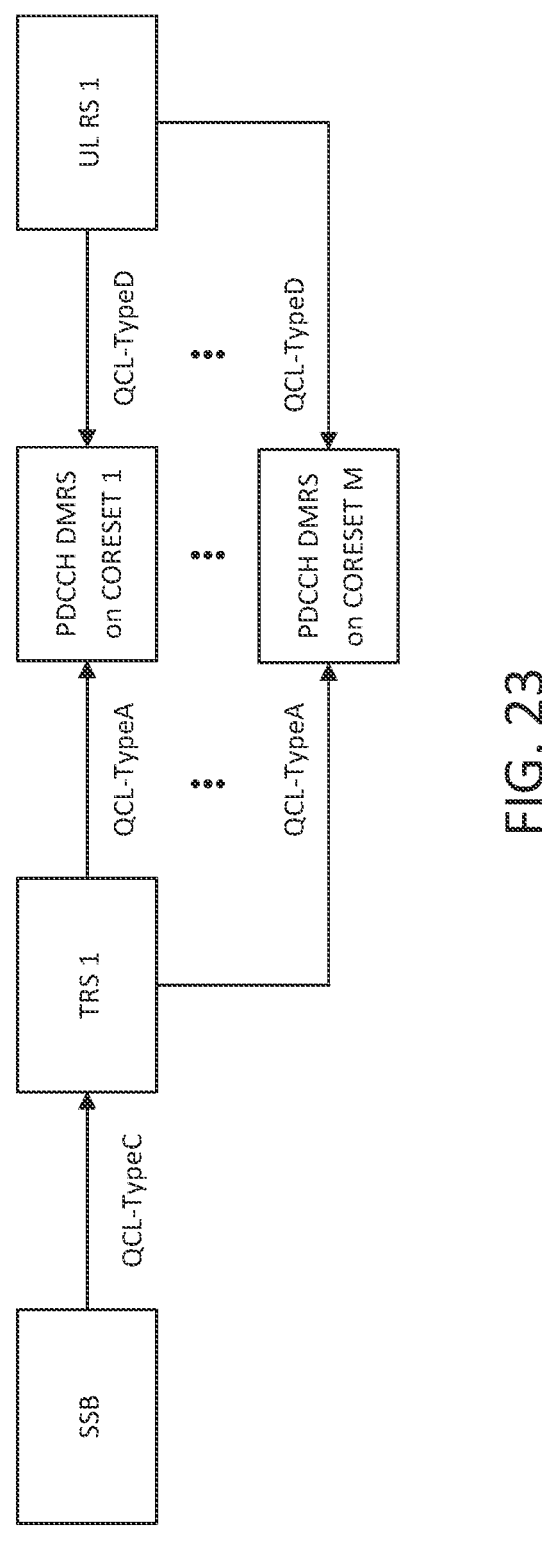
FIG. 23 illustrates an example of single TRS used as QCL-typeA source for a set of CORESETs, e.g., all CORESETs in a BWP.

The case with a single TRS associated with all M CORE-SETs in a BWP is illustrated in FIG. 23. An UL RS, e.g., SRS for BM, is QCL-typeD source for CORESETs. The TRS has an SSB as QCL-typeC source. As discussed above, the TRS may have the SSB or the UL RS as QCL-typeD source.

With the setting illustrated in FIG. 23, the network only needs to configure and transmit a single TRS in the active BWP, resulting in lower transmission and configuration overhead.

However, since TRS is a periodic CSI-RS, dynamic update of its TCI state is not supported. Instead, RRC reconfiguration is used in state-of-the-art systems. The following enhancement may efficiently address the issue.

The TCI state(s) of CORESETs can be dynamically updated/activated, e.g., using MAC CE or DCI. With common beam operation, efficient TCI state update for many CORESETs can be supported. The TCI state that is dynamically indicated for one or more CORESET(s) can include one or two source RS and one or two corresponding QCL types.

Example approach with reference to a first and second resource are below. At a first step, a first source RS (with corresponding QCL type) is applied to the one or more CORESET(s). For example, an UL RS, e.g., SRS for BM, is QCL-typeD source. For example, a DL RS, e.g., a CSI-RS for BM (e.g., with or without parameter repetition configured) or SSB, is QCL-typeD source. In some cases, the first source RS (with corresponding QCL type) is also applied to the associated RS, in addition to the CORESET(s). At a second step, a second source RS (with corresponding QCL type) is applied to the RS, e.g., TRS, associated with the CORESET(s). For example, an SSB is QCL-TypeC source.

In some cases, an indicated source RS is associated with multiple QCL types. For example, a second source RS is both a QCL-typeC source RS and a QCL-typeD source RS. In this case, there may be no first source RS in the TCI state. In some cases, the indicated one or two source RS (with corresponding QCL type(s)) is applied to the associated RS, but not to the CORESET(s). For example, a second source RS with two QCL types is applied to the associated RS, but not to the CORESET(s). In another example, two source RS with a QCL type each are applied to the associated RS, but not to the CORESET(s).

Various embodiments can be achieved for example by having UE 202 apply a second QCL type even though the TCI state indicates a first QCL type. For example, the TCI state indicates QCL-typeC as first QCL type for a first source RS. Based on being configured to do so or based on the absence of other QCL-TypeD source RS for the TRS, UE 202 assumes also QCL-TypeD based on the first source RS. In another case, UE 202 applies the first source RS with first QCL type to the TRS, for example an SSB with QCL-TypeC. In another case, UE applies the first source RS with first QCL type and second source RS with second QCL type to the TRS.

In another example, a new QCL-type is introduced, which indicates multiple QCL types, for example QCL-typeC and QCL-typeD, or QCL-typeA and QCL-typeD.

Figure 24:
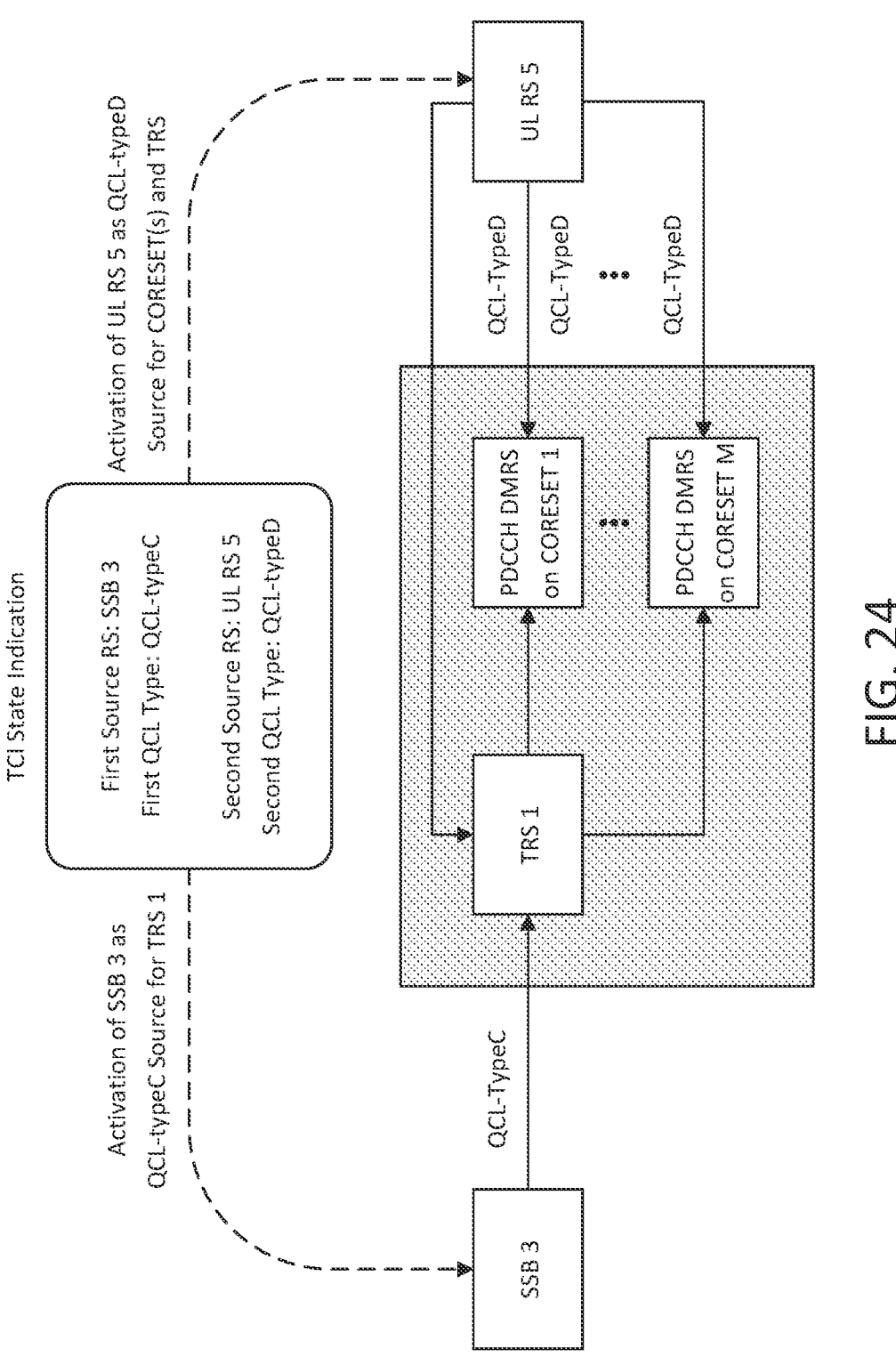
FIG. 24 illustrates an example of enhanced transmission configuration indicator (TCI) state indication.

An example approach is illustrated in FIG. 24. The first source RS in an indicated/activated TCI state is applied to a TRS (e.g., the associated TRS). The second source RS is applied to CORESET(s) and to the TRS. Note that the TCI state may be a common beam TCI state indication/activation carried in a DCI or MAC CE.

The CORESET(s) and TRS may be viewed as a multi-signal/channel aggregate to which the TCI state is applied. The aggregate is illustrated by the grey box around the TRS and the CORESETs.

Figure 25:
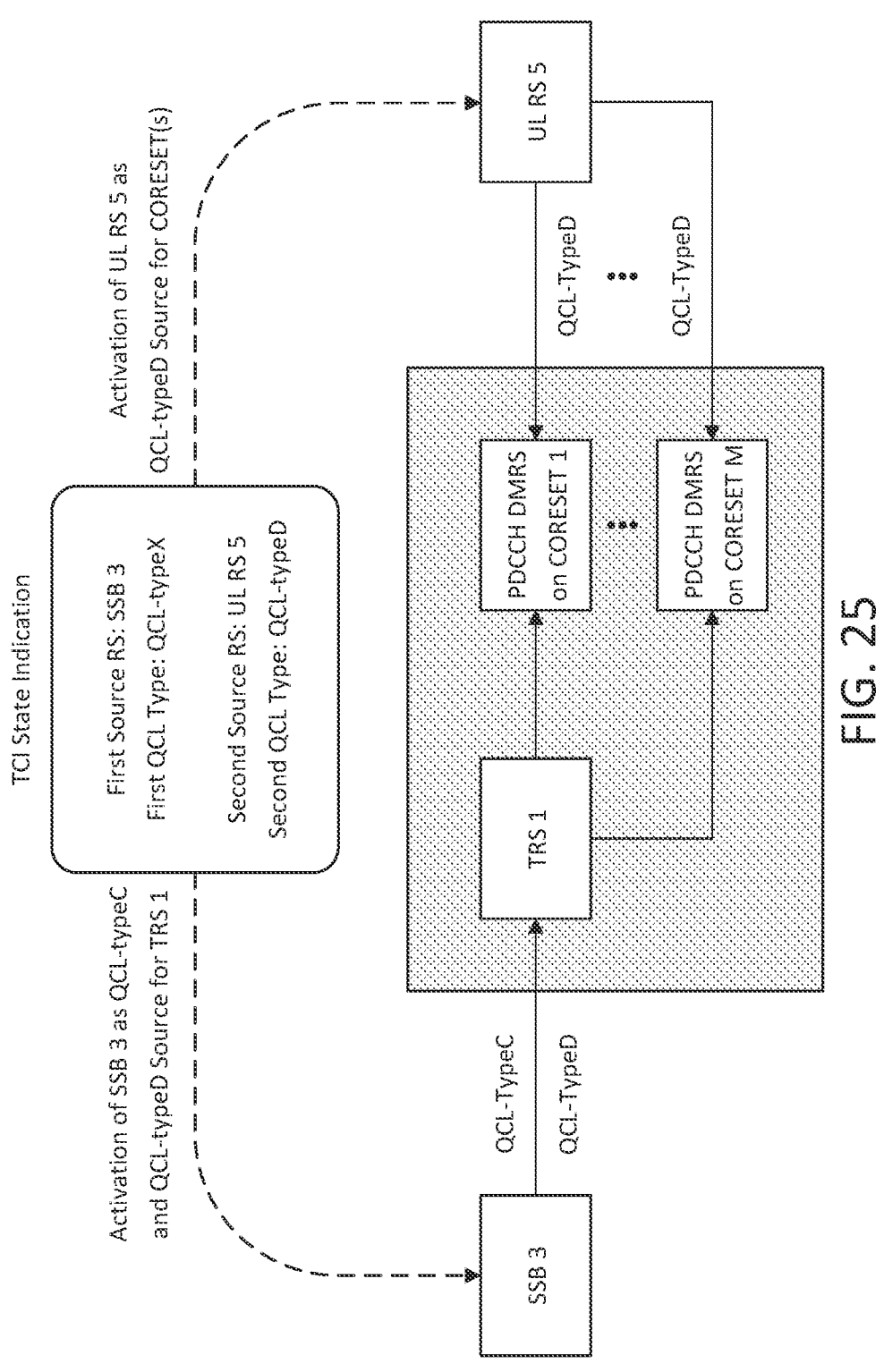
FIG. 25 illustrates an example of enhanced TCI state indication.

Another example is illustrated in FIG. 25. The first source RS in an indicated/activated TCI state is applied to a TRS (e.g., the associated TRS). The second source RS is applied to CORESET(s) and to the TRS. Note that the TCI state may be a common beam TCI state indication/activation carried in a DCI or MAC CE. The UE assumes QCL-TypeC and QCL-TypeD for the first source RS, which may be achieved in various ways, as discussed above. This is illustrated with QCL-typeX in FIG. 25.

In some cases, the QCL types of the first and second RS need to be different and, in some cases, they may be the same.

Note that no particular ordering in the signaling of the first/second source RS is assumed, e.g., the first source RS can be indicated in the qcl-Type1 or qcl-Type2 parameter in the TCI-state IE.

Also note that, even though the discussion herein primarily focuses on QCL source(s) for PDCCH, the same solutions and QCL source(s) may be applied to PDSCH. For example, in common beam operation, the activated/indicated TCI state may be applied to both PDCCH and PDSCH.

An UL RS may be configured with a DL RS as a spatial QCL source, e.g., as a spatial reference or as a spatial relation. The same DL RS may be also used as a pathloss RS, e.g., an RS used to, at least partly, determine UL transmit power. In some cases, another DL RS may be used as a pathloss reference RS. In some cases, an UL RS that serves as a DL QCL source RS is configured with a DL RS as a QCL source. For example, an SRS for BM that may be a QCL source for PDCCH/PDSCH may have an SSB as a QCL source. The QCL source RS may be configured per SRS resource set or per SRS resource.

Figure 26:
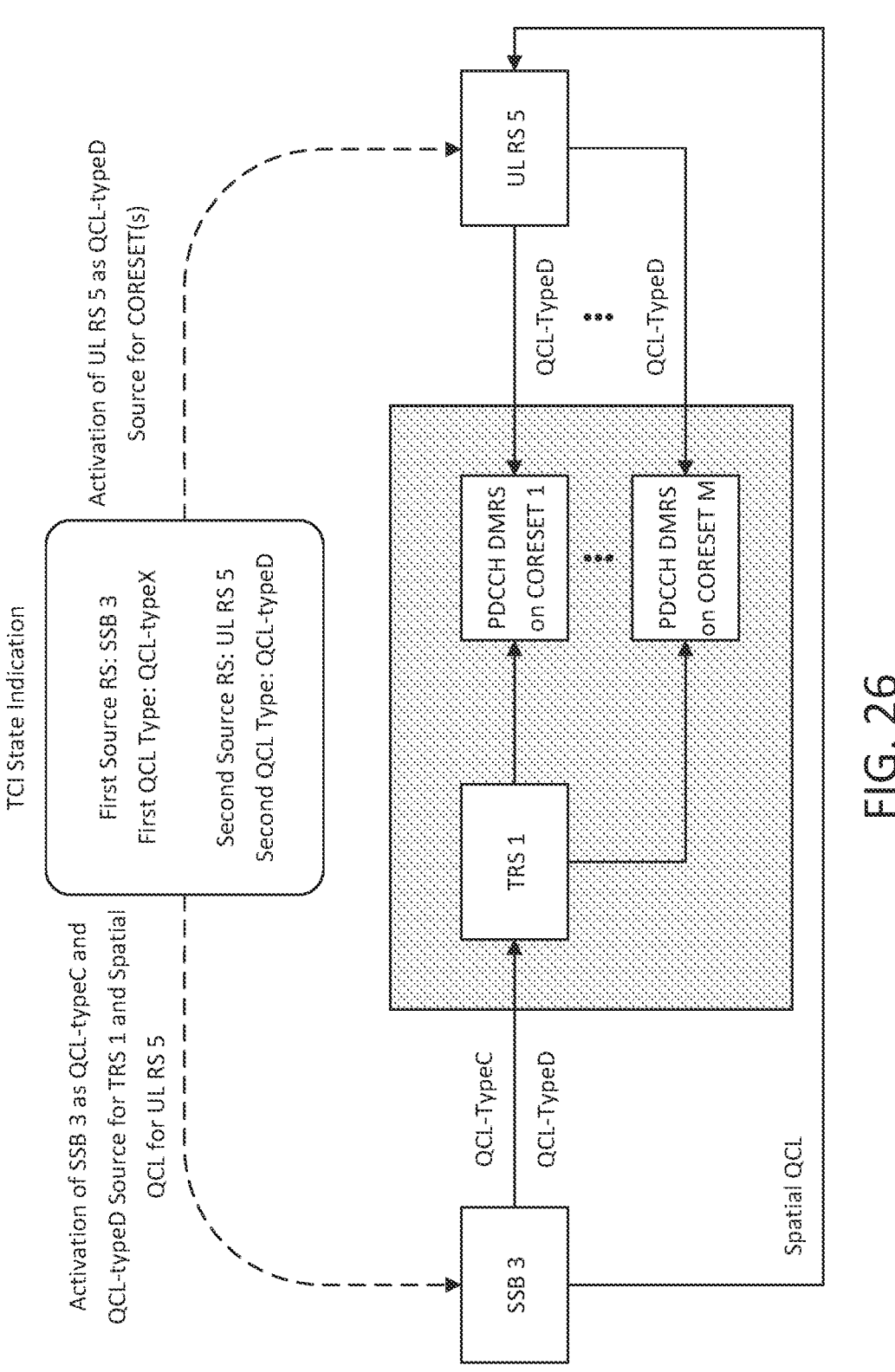
FIG. 26 illustrates an example of enhanced TCI state indication.

In some cases, the enhanced TCI state indication discusses here is also applicable to the QCL source of the UL RS that is used as QCL source RS for the DL channel/signals, e.g., PDCCH. For example, consider a case with a first source RS being a DL RS, e.g., SSB, and a second source RS being an UL RS, e.g., SRS, as illustrated in FIG. 26. In some cases, the spatial QCL source RS of the indicated UL RS (the second source RS in this example) is updated/activated to the indicated DL RS (the first source RS in this example). Note that the spatial QCL source RS of the indicated UL RS (e.g., SRS resource) may be updated/activated or the spatial QCL source RS of the UL RS resource set (e.g., SRS resource set) including the indicated UL RS is updated. In some cases, also the pathloss reference RS is also updated with the same indication. For example, if the enhanced TCI state indication indicates as source RSs an SSB, e.g., first source RS, and an SRS resource (belonging to an SRS resource set for BM), e.g., a second source RS, the spatial QCL source of the SRS resource set including the SRS resource is updated/activated. In some cases, also the pathloss RS of the SRS resource set is updated to the indicated SSB. In this case, the SSB is not only a spatial QCL source but also a pathloss source.

In some cases, different QCL types (may also be called reference types or similar) for the cases a DL RS is a source for a target UL signal/channel. For example, a first UL reference type may include spatial reference, e.g., spatial parameter or an that UE 202 shall apply the same spatial domain filter for receiving the DL RS and transmitting the target UL signal/channel. For example, a second UL reference type may include spatial reference and pathloss reference. A TCI may include a source RS which is configured with both a DL QCL type and an UL reference type.

For example, an SSB in a TCI state may be configured with QCL-typeC or D or X (for DL) and spatial reference type: {spatial reference} or {spatial reference, pathloss reference} for UL. In the example above with an UL RS as a second source RS in the TCI state, the first source RS (SSB) may for example be source RS for the TRS with the configured DL QCL type and reference RS for the second source RS (UL RS, e.g., SRS) with the configured UL reference type. In other words, the second source RS is also a target RS with the first source RS as reference, in this example.

In some cases, an RS in a TCI state with a DL QCL type and UL reference type configured is activated for a target DL signal/channel. Since the target is a DL signal/channel, UE 202 uses the DL QCL type for the RS in the TCI state, e.g., source RS. If the TCI state is activated for a target UL signal/channel, UE 202 may apply the UL reference type for the RS in the TCI, e.g., reference RS.

Handling of MPE Event

UE 202 may detect the proximity of a body in a certain direction. This may result in the reduction of maximum permissible exposure (MPE) in that direction. This may be translated into a reduced transmit power of certain UL Tx beam(s).

For the scenario that UE 202 is configured with SRS for BM, an MPE event may affect only a subset of the SRS resources, which may mean that the transmit power on some SRS resources needs to be reduces while the transmit power on other SRS resource does not need to be reduced.

If the SRS for BM are used for UL BM, such selective power reduction is suitable, since it may reflect the (relative) transmit powers that can be used on subsequent UL transmissions using the corresponding beams.

On the other hand, if the SRS for BM are used for DL BM, as discussed herein, such selective power reduction might not be suitable, since the DL transmit power is not affected by the MPE. The use of the corresponding beam for DL reception is not affected, i.e., a power reduction on the corresponding SRS could mislead the network to incorrectly change current DL serving beam(s).

Hence, the following solutions can be considered.

If the transmit power of a first SRS resource in an SRS resource set for BM has to be reduced, e.g., by A dB, due to an MPE event, the transmit powers of: the transmit powers of all SRS resources in the same SRS resource set as the first SRS resource are reduced (e.g., by A dB); the transmit powers of all SRS resources in the same and other SRS resource sets for BM as the first SRS resource (other resource sets may be those used for DL BM, those with an enabling parameter, etc.) in the active BWP are reduced (e.g., by A dB); or the transmit powers of all SRS resources with the same spatial relation or UL TCI state as the first SRS resource, are reduced (e.g., by A dB).

In some cases, it may be possible for UE 202 to distinguish if an SRS resource set for BM is used for DL BM or for UL BM. For example, if SRS resource(s) in the set are used source RS for DL signals/channels, UE 202 may determine that the SRS resource set if used for DL BM. For example, if SRS resource(s) in the set are used source RS (or spatial relation) for UL signals/channels, UE 202 may determine that the SRS resource set if used for UL BM.

In some cases, e.g., if UE 202 is configured to do so, UE 202 skips transmission of an SRS resource or a corresponding SRS resource set upon MPE event for the SRS resource. UE 202 may skip one or more transmission occasions, e.g., during the duration of the MPE event.

In some cases, UE 202 applies a solution described herein only if the UE 202 determines that the SRS resource set is used for DL BM or that the SRS resource set is used for DL BM, but not UL BM.

In some case, the network can configure UE 202 to apply a solution described herein, e.g., using a parameter in the corresponding SRS resource set IE.

In some cases, UE 202 may report an MPE event to the network, for example in PUCCH or in a MAC CE in PUSCH. Reporting may be periodic, semi-persistent or aperiodic, e.g., triggered by one or a combination of: an MPE event, the radio link quality has deteriorated below a threshold, UE 202 has declared a beam failure and initiated BFR, or UE 202 reports power headroom (PHR).

A report may include one or more of: 1) Information about which UL Tx beam(s) that experienced an MPE event, e.g., SRS resource index(es) or SRS resource index(es) within one or more SRS resource set(s) for BM (e.g., counting only among those SRS resources to save indexing bits) or UL (transmit) panel index; or 2) information about the level of transmit power backoff required, e.g., in dB.

In case such reporting is used, the transmit power backoff for SRS resources not directly affected by an MPE event, as disclosed herein, might not be needed.

Figure 27:
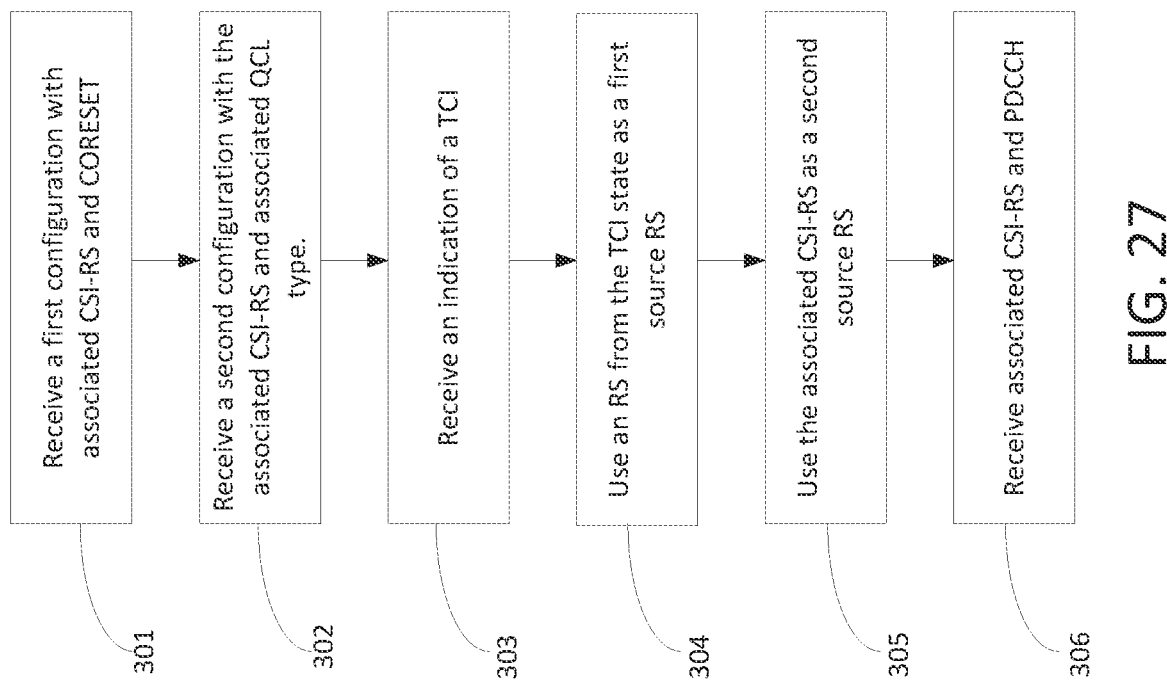
FIG. 27 illustrates an exemplary method for beam management enhancements.

FIG. 27 illustrates an exemplary method for beam management enhancements. At step 301, UE 202 may receive a first configuration of a quasi co-location (QCL) relation between a channel state information—reference signal (associated CSI-RS) and a control resource set (CORESET). At step 302, UE 202 may receive a second configuration a QCL type between the associated CSI-RS and the CORESET (e.g., associated QCL type)). In other words, the second configuration may include the associated CSI-RS and an associated QCL type.

At step 303, UE 202 may receive an indication of a transmission configuration indicator (TCI) state for the CORESET. The transmission configuration indicator (TCI) state for the CORESET may include one or more RS and one or more corresponding QCL types. At step 304, UE 202 may use an RS with a first QCL type from the TCI state as a first source RS and a first QCL type for the associated CSI-RS. The first QCL type may indicate which parameters UE 202 may derive from the first RS (e.g., source RS) and apply to reception of associated CSI-RS (e.g., target RS). In other words, as an example: Source RS is RS1 in the indicated TCI state; QCL type is the QCL type configured for RS1 in the TCI state; and Target RS is the associated CSI-RS. At step 305, UE 202 may use the associated CSI-RS as a second source RS with the associated QCL type for the PDCCH DMRS. The disclosed steps may occur on one device or be distributed over multiple devices. In other words, as an example: Source RS is the associated CSI-RS; QCL type is a QCL type of the QCL relationship between the source RS (the associated CSI-RS) and the target RS; and Target RS is the PDCCH DMRS. TCI states are legacy information elements that usually include 1 or 2 pairs of (source RS, QCL type). A large set of TCI states may be configured. For a certain signal or channel, one of these TCI states may be indicated or configured. However, the QCL type in here might not be configured in a TCI state, it might be configured directly in a configuration for a CORESET.

At step 306, UE 202 may receive the associated CSI-RS and the physical downlink control channel (PDCCH) demodulation RS (DMRS) in the CORESET. The determination of source RS (e.g., step 304 and step 305) may occur before the reception of signals or channels here step 306.

In general, a QCL relationship may mean that UE 202 may derive certain parameters from the source RS and use the parameter estimates when receiving the target RS. The QCL type conveys which kind of parameters UE 202 may estimate from the source RS and use for reception of target RS. When UE 202 "uses" a source RS and QCL type for reception of the target RS, UE 202 may estimate some parameters/properties from the source RS and then use the estimates for the reception of the target RS.

It is understood that the entities performing the steps illustrated herein may be logical entities. The steps may be stored in a memory of, and executing on a processor of, a device, server, or computer system such as those illustrated in FIG. 29F or FIG. 29G. Skipping steps, combining steps, or adding steps between exemplary methods disclosed herein is contemplated. Table 4 discloses abbreviations and definitions.

TABLE 4

Abbreviations and Definitions

| Abbreviations | Definitions |
| --- | --- |
| BFD | Beam Failure Detection |
| BFR | Beam Failure Recovery |
| BM | Beam Management or 'beamManagement' (e.g., value of RRC parameter usage) |
| BWP | BandWidth Part |
| CC | Component Carrier |
| CORESET | Control Resource Set |
| CSI-RS | Channel State Information RS |

TABLE 4-continued

Abbreviations and Definitions

| Abbreviations | Definitions |
| --- | --- |
| DCI | Downlink Control Information |
| DL | Downlink |
| DMRS | Demodulation RS |
| FDM | Frequency Division Multiplexing |
| FDMed | Frequency Division Multiplexed |
| gNB | NR NodeB |
| ID | identity and/or index |
| IE | Information Element |
| L1 | Layer 1 |
| MAC | Medium Access Control |
| MAC CE | MAC Control Element |
| MPE | Maximum Permissible Exposure |
| NR | New Radio |
| NW | Network |
| NZP | Non Zero Power |
| PCell | Primary Cell |
| PDCCH | Physical Downlink Control CHannel(s) |
| PDSCH | Physical Downlink Shared CHannel(s) |
| PUCCH | Physical Uplink Control CHannel(s) |
| PUSCH | Physical Uplink Shared CHannel(s) |
| PHR | Power HeadRoom |
| PHY | Physical Layer |
| PRB | Physical RB |
| PSCell | Primary SCG Cell |
| QCL | Quasi Co-location |
| RAN | Radio Access Network |
| RE | Resource Element |
| RP | Reception Point |
| RRC | Radio Resource Control |
| RS | Reference Signal(s) |
| RSRP | Reference Signal Received Power |
| Rx | Reception |
| SCell | Secondary Cell |
| SCG | Secondary Cell Group |
| SINR | Signal to Interference plus Noise power Ratio |
| SpCell | Special Cell (PCell or PSCell) |
| SRS | Sounding RS |
| SRSRS | SRS Resource Set |
| SS | Synchronization Signal |
| SSB | SS/PBCH Block |
| SSS | Search Space Set |
| TB | Transport Block |
| TCI | Transmission Configuration Indicator |
| TDD | Time Division Duplex |
| TDM | Time Division Multiplexing |
| TDMed | Time Division Multiplexed |
| TRP | Transmission and/or Reception Point |
| TRS | Tracking Reference Signal (or CSI-RS (resource set) for tracking |
| Tx | Transmission |
| UE | User Equipment |
| UL | Uplink |

Figure 28:
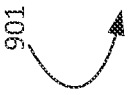
FIG. 28 illustrates an exemplary display (e.g., graphical user interface) that may be generated based on the methods, systems, and devices of Beam management enhancements.

FIG. 28 illustrates an exemplary display (e.g., graphical user interface) that may be generated based on the methods, systems, and devices of Beam management enhancements, as discussed herein. Display interface 901 (e.g., touch screen display) may provide text in block 902 associated with of Beam management enhancements, such as parameters, method flow, and associated current conditions. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices of Beam management enhancements, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 29A:
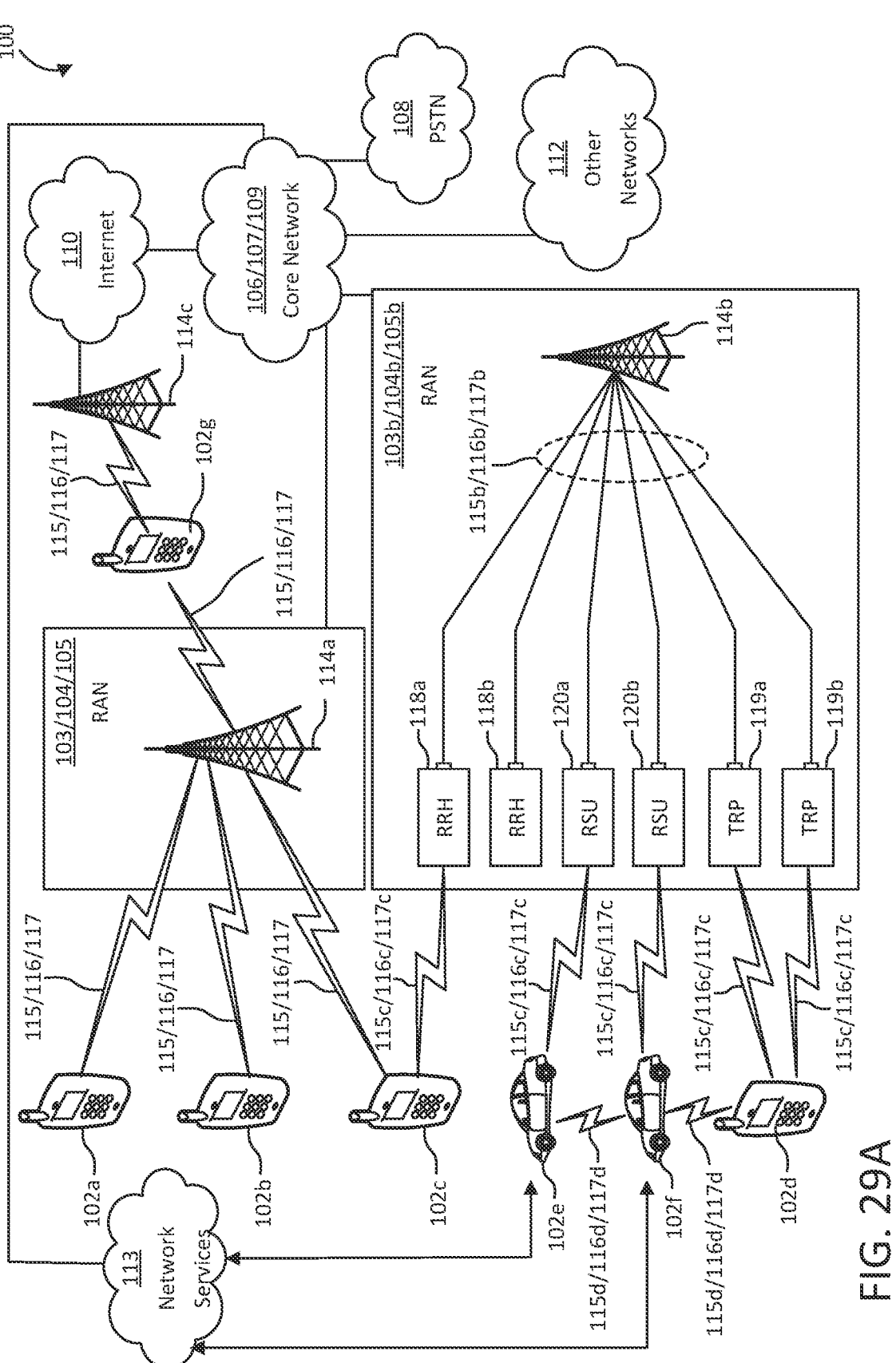
FIG. 29A illustrates an example communications system.

FIG. 29A illustrates an example communications system 100 in which the methods and apparatuses of Beam management enhancements, such as the systems and methods illustrated in FIG. 1 through FIG. 26 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 29A, FIG. 29B, FIG. 29C, FIG. 29D, FIG. 29E, or FIG. 29F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 29A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of Beam management enhancements, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 29A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of Beam management enhancements, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 29A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 29A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of Beam management enhancements, as disclosed herein. For example, the WTRU 102g shown in FIG. 29A may be configured to communicate with the base station 114a, which may employ a cellular-based radio technology, and with the base station 114c, which may employ an IEEE 802 radio technology.

Although not shown in FIG. 29A, it will be appreciated that a User Equipment may make a wired connection to a gateway. The gateway maybe a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115c/116c/117c may equally apply to a wired connection.

Figure 29B:
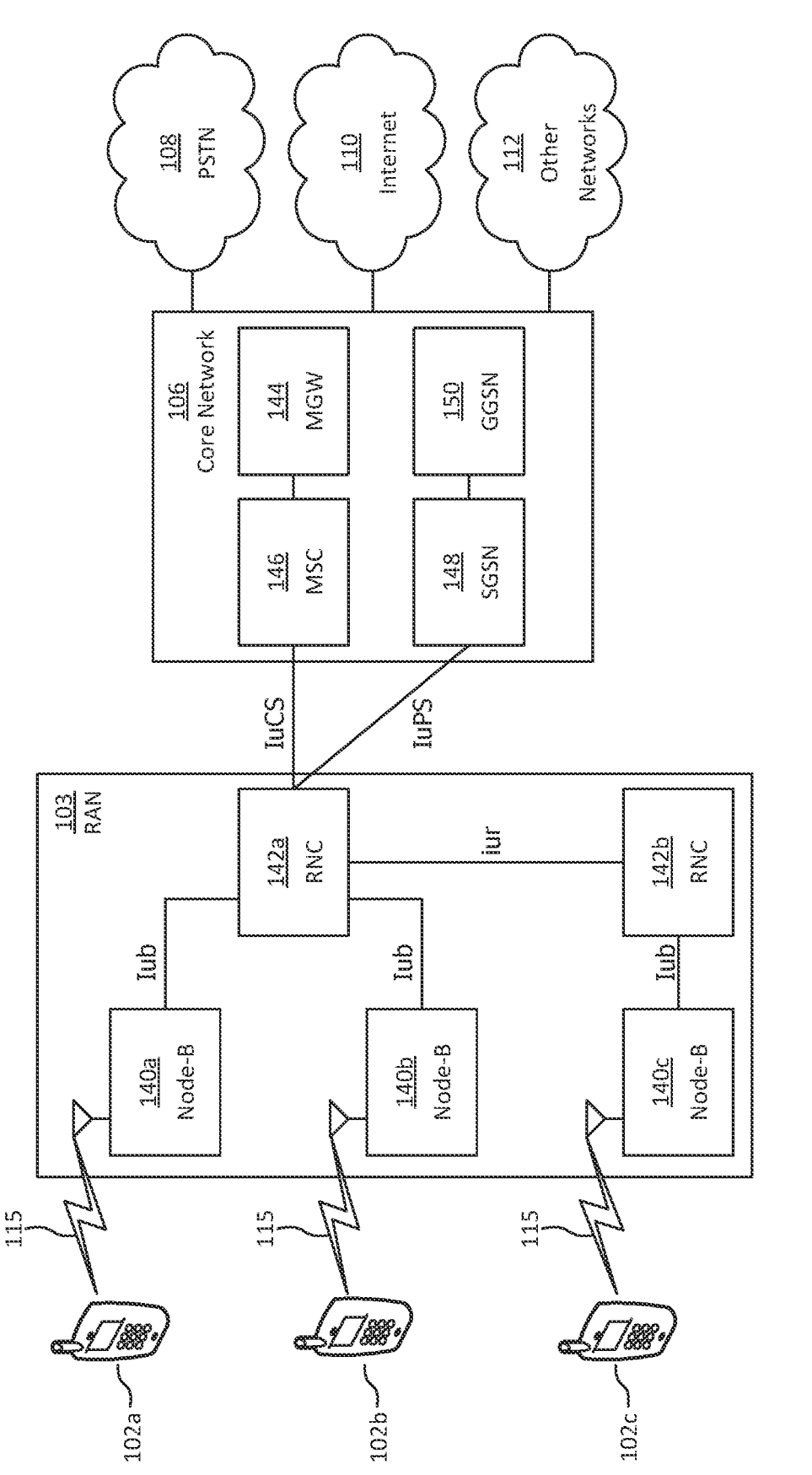
FIG. 29B illustrates an exemplary system that includes RANs and core networks.

FIG. 29B is a system diagram of an example RAN 103 and core network 106 that may implement methods, systems, and devices of Beam management enhancements, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 29B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 29B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 29B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 29C:
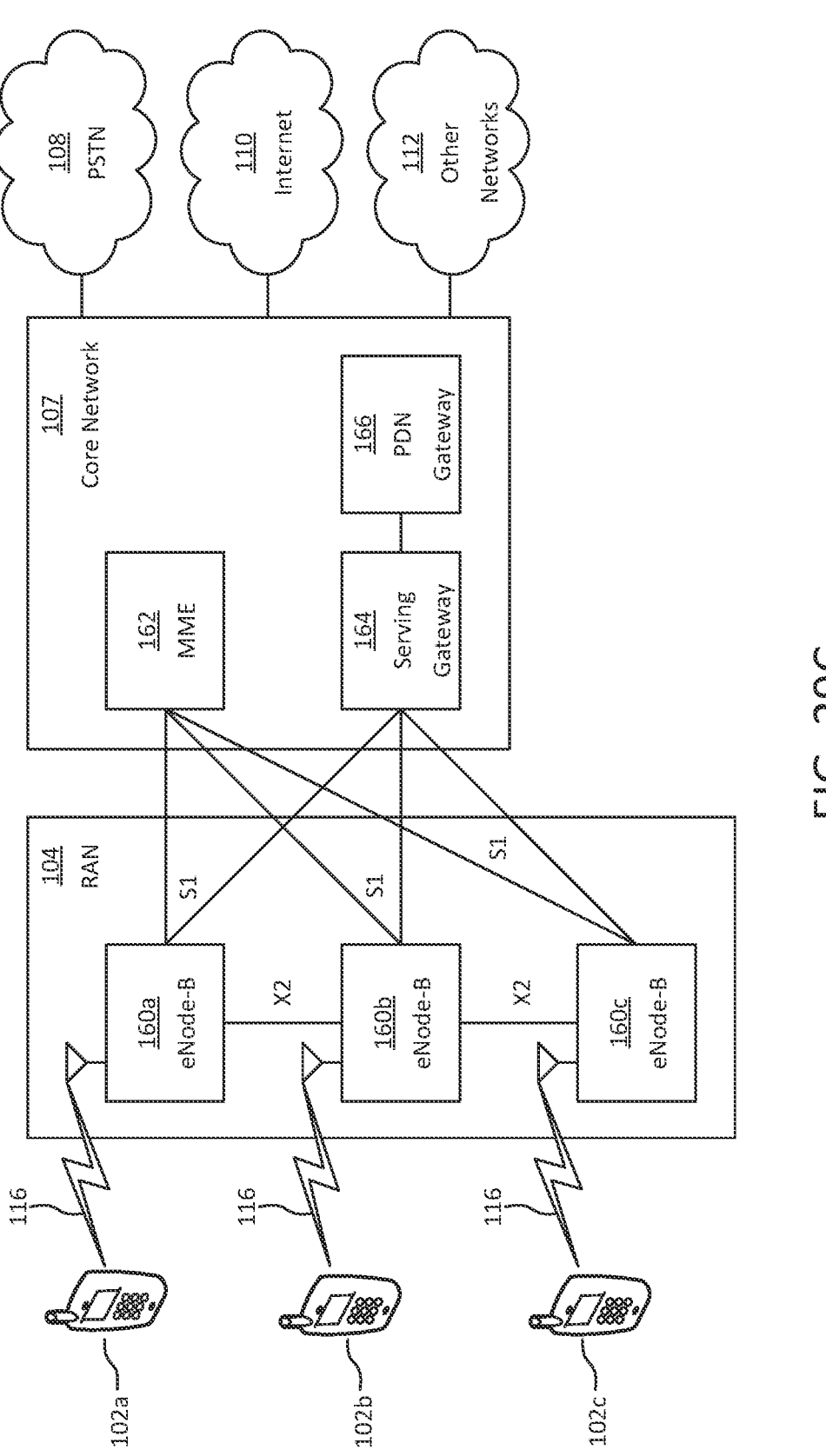
FIG. 29C illustrates an exemplary system that includes RANs and core networks.

FIG. 29C is a system diagram of an example RAN 104 and core network 107 that may implement methods, systems, and devices of Beam management enhancements, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 29C, the eNode-Bs 160a, 160b, and 160c may communicate with one another over an X2 interface.

The core network 107 shown in FIG. 29C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 29D:
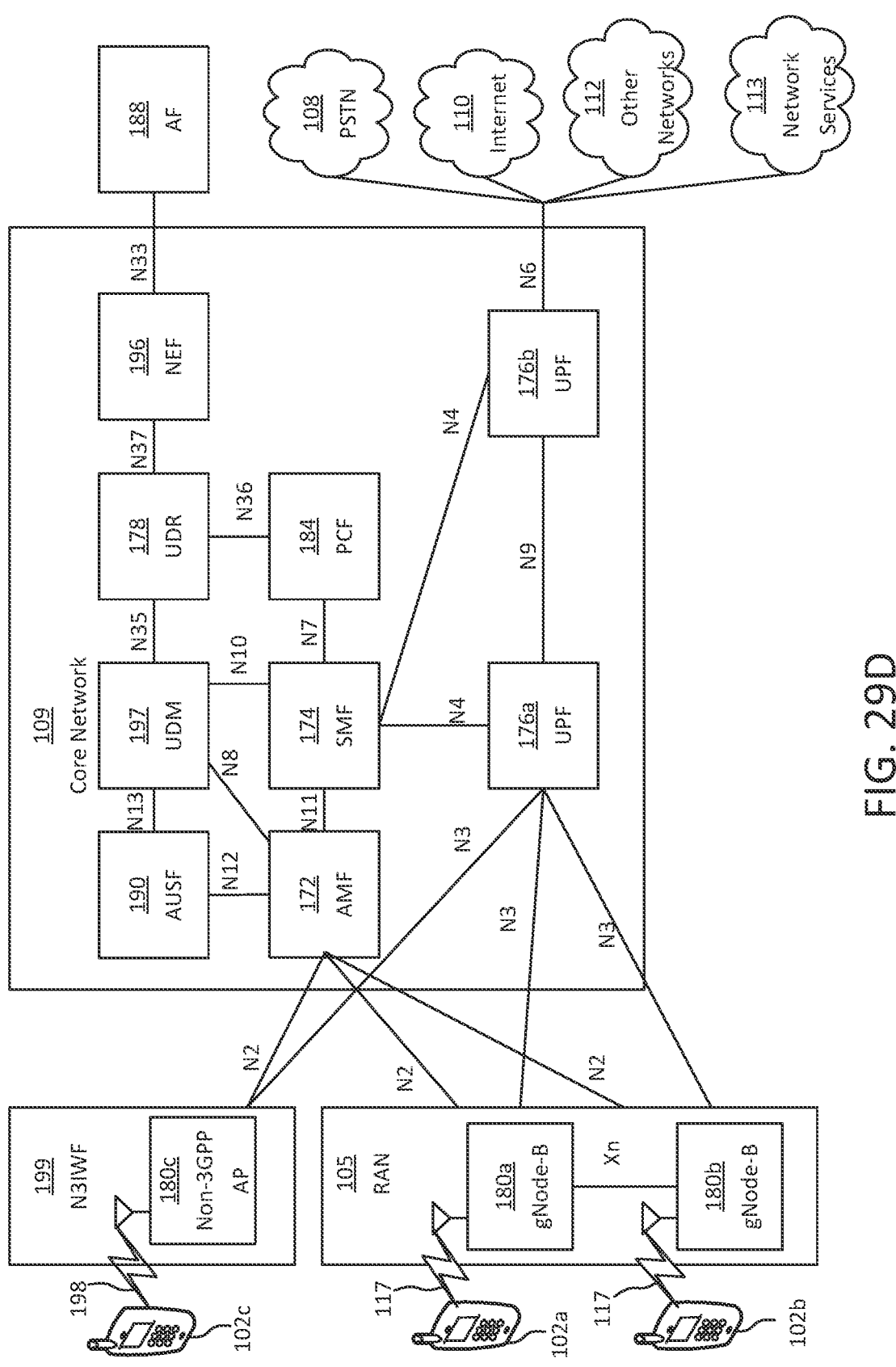
FIG. 29D illustrates an exemplary system that includes RANs and core networks.

FIG. 29D is a system diagram of an example RAN 105 and core network 109 that may implement methods, systems, and devices of Beam management enhancements, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 29D, the gNode-Bs 180a and 180b may communicate with one another over an Xn interface, for example.

The core network 109 shown in FIG. 29D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 29G.

In the example of FIG. 29D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 29D shows that network functions directly connect with one another, however, it should be appreciated that they may communicate via routing agents such as a diameter routing agent or message buses.

In the example of FIG. 29D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 29D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102*a*, 102*b*, and 102*c*, management and configuration of traffic steering rules in the UPF 176*a* and UPF 176*b*, and generation of downlink data notifications to the AMF 172.

The UPF 176*a* and UPF 176*b* may provide the WTRUs 102*a*, 102*b*, and 102*c* with access to a Packet Data Network (PDN), such as the Internet 110, to facilitate communications between the WTRUs 102*a*, 102*b*, and 102*c* and other devices. The UPF 176*a* and UPF 176*b* may also provide the WTRUs 102*a*, 102*b*, and 102*c* with access to other types of packet data networks. For example, Other Networks 112 may be Ethernet Networks or any type of network that exchanges packets of data. The UPF 176*a* and UPF 176*b* may receive traffic steering rules from the SMF 174 via the N4 interface. The UPF 176*a* and UPF 176*b* may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102*c* and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 29D. The PCF 184 may provide policy rules to control plane nodes such as the AMF 172 and SMF 174, allowing the control plane nodes to enforce these rules. The PCF 184, may send policies to the AMF 172 for the WTRUs 102*a*, 102*b*, and 102*c* so that the AMF may deliver the policies to the WTRUs 102*a*, 102*b*, and 102*c* via an N1 interface. Policies may then be enforced, or applied, at the WTRUs 102*a*, 102*b*, and 102*c*.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 29D, in a network slicing scenario, a WTRU 102*a*, 102*b*, or 102*c* may connect with an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned or operated by other service providers.

The core network entities described herein and illustrated in FIG. 29A, FIG. 29C, FIG. 29D, or FIG. 29E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 29A, FIG. 29B, FIG. 29C, FIG. 29D, or FIG. 29E are provided by way of example only, and it is understood that the subject matter disclosed and claimed herein may be embodied or implemented in any similar communication system, whether presently defined or defined in the future.

Figure 29E:
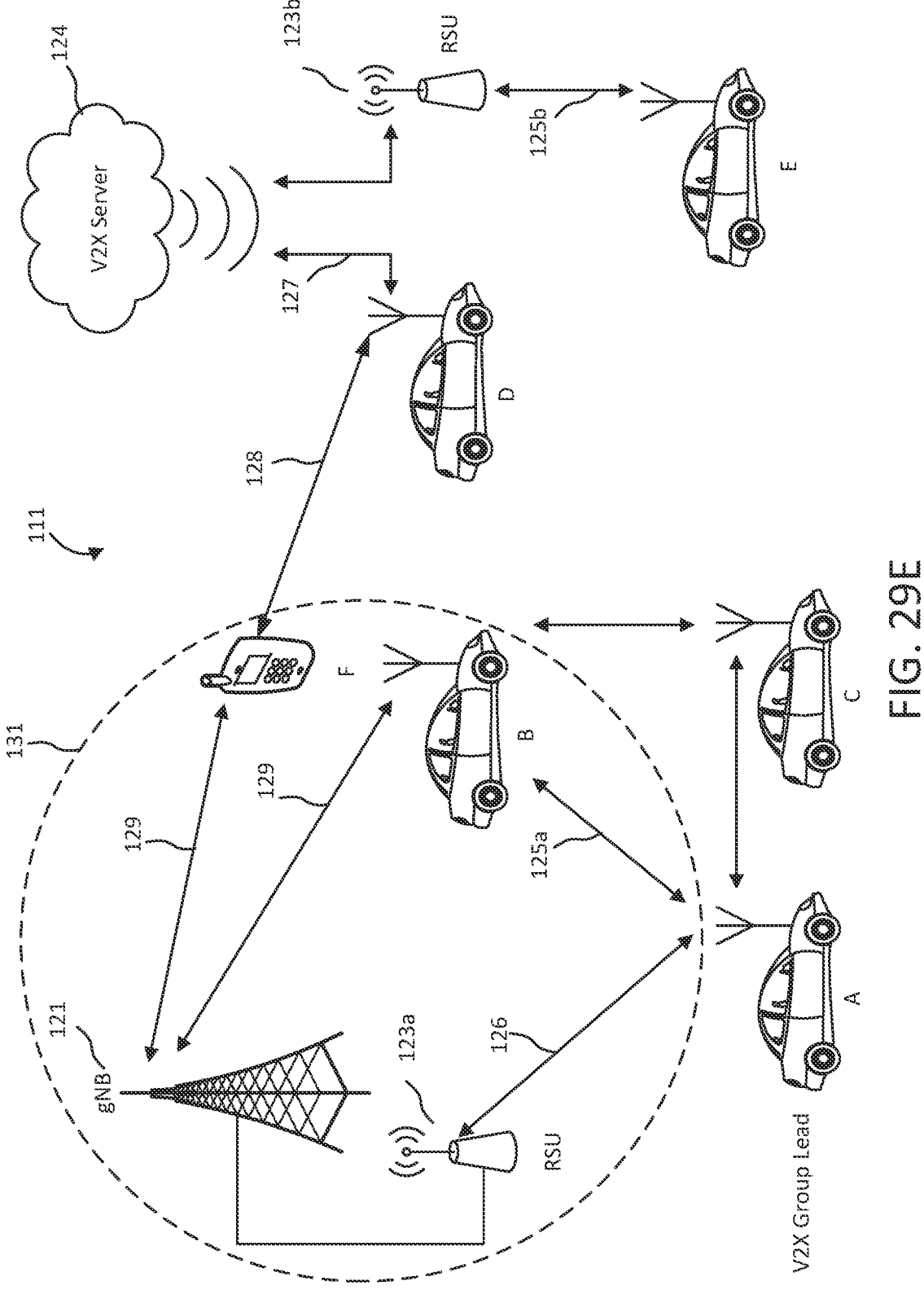
FIG. 29E illustrates another example communications system.

FIG. 29E illustrates an example communications system 111 in which the systems, methods, apparatuses that implement Beam management enhancements, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 29E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 29E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 29F:
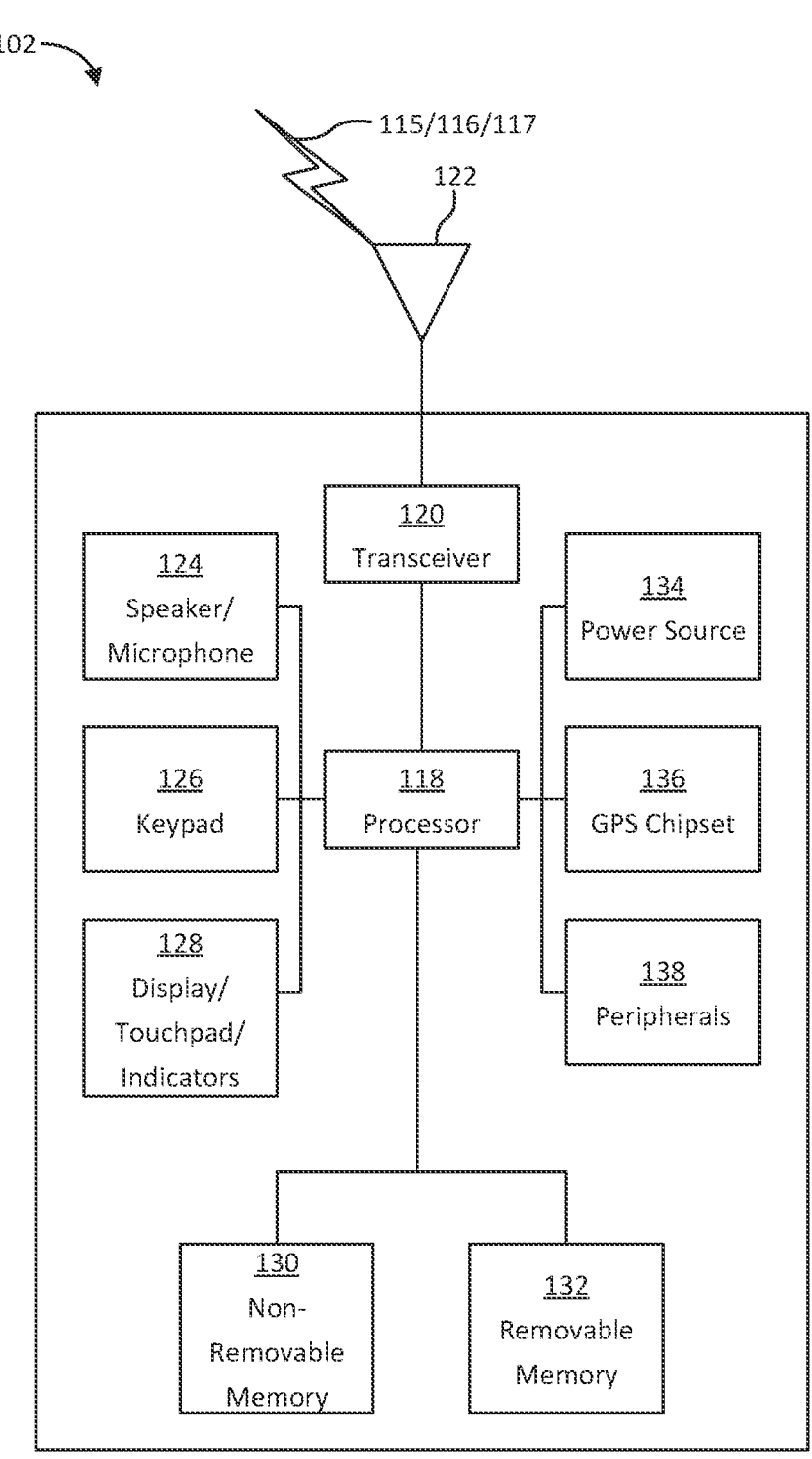
FIG. 29F is a block diagram of an example apparatus or device, such as a WTRU.

FIG. 29F is a block diagram of an example apparatus or device WTRU 102 that may be configured for wireless communications and operations in accordance with the systems, methods, and apparatuses that implement Beam management enhancements, described herein, such as a WTRU 102 of FIG. 29A, FIG. 29B, FIG. 29C, FIG. 29D, or FIG. 29E, or FIG. 1-FIG. 26. As shown in FIG. 29F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 29F and may be an exemplary implementation that performs the disclosed systems and methods for device Beam management enhancements described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 29F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 29A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 29F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the beams in some of the examples described herein are successful or unsuccessful, or otherwise indicate a status of Beam management enhancements and associated components. The control lighting patterns, images, or colors on the display or indicators 128 may be reflective of the status of any of the method flows or components in the FIG.'s illustrated or discussed herein (e.g., FIG. 1-FIG. 26, etc). Disclosed herein are messages and procedures of Beam management enhancements. The messages and procedures may be extended to provide interface/API for users to request resources via an input source (e.g., speaker/microphone 124, keypad 126, or display/touchpad/indicators 128) and request, configure, or query Beam management enhancements related information, among other things that may be displayed on display 128.

The processor 118 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 29G:
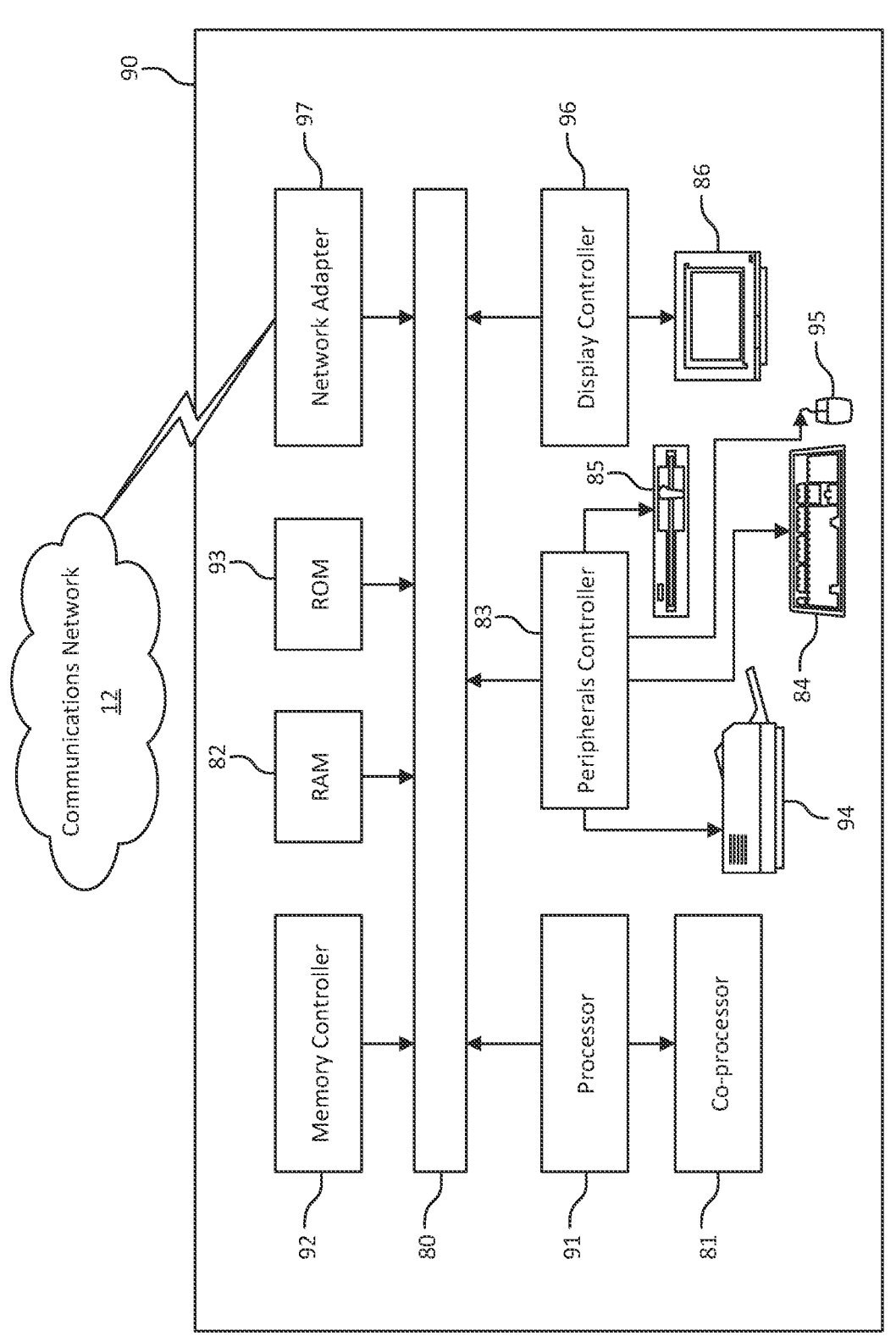
FIG. 29G is a block diagram of an exemplary computing system.

FIG. 29G is a block diagram of an exemplary computing system 90 in which one or more apparatuses of the communications networks illustrated in FIG. 29A, FIG. 29C, FIG. 29D and FIG. 29E as well as Beam management enhancements, such as the systems and methods illustrated in FIG. 1 through FIG. 26 described and claimed herein may be embodied, such as certain nodes or functional entities in the RAN 103/104/105, Core Network 106/107/109, PSTN

108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for Beam management enhancements.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 29A, FIG. 29B, FIG. 29C, FIG. 29D, or FIG. 29E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—beam management enhancements—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein). All combinations (including the removal or addition of steps) are contemplated in a manner that does not directly conflict with the other portions of the detailed description.

Methods, systems, and apparatuses, among other things, as described herein may provide for beam management. A method, system, computer readable storage medium, or apparatus provides for transmitting SRS for BM, the SRS measured using multiple beams; receiving an indication to use a particular SRS as QCL source assumption for gNB's DL transmission(s); and using the beam corresponding to an indicated SRS to receive the DL transmission(s). A UE may be configured with an associated CSI-RS (TRS) for a CORESET and the UE may use the CSI-RS as QCL-TypeA source RS for the CORESET DMRS. The UE is indicated a TCI state, for example including a first source RS for QCL-TypeD and a second source RS for QCL-TypeC. The UE may apply the first source RS (with QCL-TypeD) to the associated CSI-RS and the CORESET, while it applies the second source RS (e.g. QCL-TypeC) to the associated CSI-RS. The system, method, or apparatus may manage a beam based on the TCI state, as disclosed. An apparatus (e.g., a base station) may provide for sending a first configuration of a quasi co-location (QCL) relation between a channel state information-reference signal (associated CSI-RS) and a control resource set (CORESET); sending a second configuration, the second configuration comprising the associated CSI-RS and an associated QCL type; sending an indication of a transmission configuration indicator (TCI) state for the CORESET, wherein the transmission configuration indicator (TCI) state for the CORESET comprises one or more RS and one or more corresponding QCL types; sending the associated CSI-RS and a physical downlink control channel (PDCCH) demodulation RS (DMRS) in the CORESET such that a first RS with a first QCL type from the TCI state can act as a first source RS and a first QCL type for the associated CSI-RS; and the associated CSI-RS with a first associated first QCL type can act as a second source RS and a first QCL type for the PDCCH DMRS. All combinations in this paragraph (including the removal or addition of steps) are contemplated in a manner that is consistent with the other portions of the detailed description.

A method, system, computer readable storage medium, or apparatus provides for receiving a first configuration of a quasi co-location (QCL) relation between a channel state information—reference signal (associated CSI-RS) and a control resource set (CORESET); receiving a second configuration of a QCL type between the associated CSI-RS and the CORESET (associated QCL type); receiving an indication of a transmission configuration indicator (TCI) state for the CORESET comprising one or more RS and one or more corresponding QCL types; receiving the associated CSI-RS and the physical downlink control channel (PDCCH) demodulation RS (DMRS) in the CORESET; using an RS from the TCI state as a first source RS with the corresponding QCL type for the associated CSI-RS; and using the associated CSI-RS as a second source RS with the associated QCL type for the PDCCH DMRS. The "first source RS" of element are in general different from "second source RS", even though it's not precluded that they happen to be the same. "Being the same" here means that even though the indication/configuration of the two "source RSs" are separate, the indication/configuration may be such that they indicate/configure the same signal. The methods, systems, or apparatuses may provide for using a second RS with a second QCL type from the TCI state as a third source RS and a second QCL type for the PDCCH DMRS. All combinations in this paragraph and the above paragraph (including the removal or addition of steps) are contemplated in a manner that is consistent with the other portions of the detailed description.

What is claimed is:

1. A method comprising:

receiving configuration information, wherein the configuration information indicates a control resource set (CORESET) has a first quasi co-location (QCL) relationship of a first type with a downlink (DL) reference signal (RS);

receiving an activation indication, wherein the activation indication indicates a second an uplink (UL) RS has a second QCL relationship of a second type with the CORESET and with the DL RS;

receiving the DL RS based on the second QCL relationship with the second UL RS; and based on the first QCL relationship with the DL RS and the second QCL relationship with the UL RS, receiving a physical downlink control channel (PDCCH) using the CORESET.

2. The method of claim 1, wherein the activation indication further indicates a second DL RS has a third QCL relationship of a third type with the DL RS.

3. The method of claim 2, further comprising receiving the DL RS based on the third QCL relationship with the second DL RS.

4. The method of claim 2, wherein:

the second DL RS comprises a synchronization signal block (SSB); and the third QCL relationship comprises QCL-Type C.

5. The method of claim 1, wherein the CORESET comprises a demodulation reference signal (DMRS).

6. The method of claim 1, wherein the first QCL relationship comprises QCL-TypeA.

7. The method of claim 1, wherein the DL RS comprises a tracking RS (TRS).

8. The method of claim 1, wherein the UL RS comprises a UL sounding RS (SRS).

9. The method of claim 1, wherein the second QCL relationship comprises QCL-TypeD.

10. A wireless transmit/receive unit (WTRU) comprising:

a processor; and memory coupled with the processor, the memory comprising executable instructions stored thereon that when executed by the processor cause the processor to effectuate operations comprising:

receiving configuration information, wherein the configuration information indicates a control resource set (CORESET) has a first quasi co-location (QCL) relationship of a first type with a downlink (DL) reference signal (RS);

receiving an activation indication, wherein the activation indication indicates a second an uplink (UL) RS has a second QCL relationship of a second type with the CORESET and with the DL RS;

receiving the DL RS based on the second QCL relationship with the UL RS; and based on the first QCL relationship with the DL RS and the second QCL relationship with the UL RS, receiving a physical downlink control channel (PDCCH) using the CORESET.

11. The WTRU of claim 10, wherein the activation indication further indicates a second DL RS has a third QCL relationship of a third type with the DL RS.

12. The WTRU of claim 11, the operations further comprising receiving the DL RS based on the third QCL relationship with the second DL RS.

13. The WTRU of claim 11, wherein:

the second DL RS comprises a synchronization signal block (SSB); and the third QCL relationship comprises QCL-Type C.

14. The WTRU of claim 10, wherein the CORESET comprises a demodulation RS (DMRS).

15. The WTRU of claim 10, wherein the first QCL relationship comprises QCL-TypeA.

16. The WTRU of claim 10, wherein the DL RS comprises a tracking RS (TRS).

17. The WTRU of claim 10, wherein the UL RS comprises a UL sounding RS (SRS).

18. The WTRU of claim 10, wherein the second QCL relationship comprises QCL-TypeD.

19. An apparatus comprising:

a processor; and memory coupled with the processor, the memory comprising executable instructions stored thereon that when executed by the processor cause the processor to effectuate operations comprising:

sending configuration information, wherein the configuration information indicates a control resource set (CORESET) has a first quasi co-location (QCL) relationship of a first type with a downlink (DL) reference signal (RS);

sending an activation indication, wherein the activation indication indicates an uplink (UL) RS has a second QCL relationship of a second type with the CORESET and with the DL RS;

sending the DL RS based on the second QCL relationship with the UL RS; and based on the first QCL relationship with the DL RS and the second QCL relationship with the UL RS, sending a physical downlink control channel (PDCCH) using the CORESET.

20. The apparatus of claim 19, wherein the activation indication further indicates a second DL RS has a third QCL relationship of a third type with the DL RS.

* * * * *